US007200853B2

(12) United States Patent
Kawai

(10) Patent No.: US 7,200,853 B2
(45) Date of Patent: Apr. 3, 2007

(54) ELECTRONIC INFORMATION CONTENT DISTRIBUTION PROCESSING SYSTEM, INFORMATION DISTRIBUTION APPARATUS, INFORMATION PROCESSING APPARATUS, AND ELECTRONIC INFORMATION CONTENT DISTRIBUTION PROCESSING METHOD

(75) Inventor: Eiji Kawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1162 days.

(21) Appl. No.: 09/800,899

(22) Filed: Mar. 7, 2001

(65) Prior Publication Data

US 2001/0052123 A1 Dec. 13, 2001

(30) Foreign Application Priority Data

Mar. 8, 2000 (JP) ............................ 2000-064092
Jun. 12, 2000 (JP) ............................ 2000-175989

(51) Int. Cl.
*H04N 7/10* (2006.01)
*H04N 7/025* (2006.01)

(52) U.S. Cl. ............................ 725/34; 725/32; 725/35; 725/42; 725/141; 370/473

(58) Field of Classification Search ................. 725/32, 725/34, 35, 36, 42
See application file for complete search history.

(56) References Cited

U.S. PATENT DOCUMENTS

| | | | | |
|---|---|---|---|---|
| 5,663,757 A | * | 9/1997 | Morales | ......................... 725/5 |
| 5,666,645 A | | 9/1997 | Thomas et al. | |
| 5,774,170 A | * | 6/1998 | Hite et al. | ..................... 725/34 |
| 5,872,588 A | * | 2/1999 | Aras et al. | ..................... 725/14 |
| 5,931,908 A | * | 8/1999 | Gerba et al. | ................ 709/219 |
| 5,943,467 A | * | 8/1999 | Beyers et al. | .................. 386/83 |

(Continued)

FOREIGN PATENT DOCUMENTS

WO WO 99 38321 7/1999

(Continued)

OTHER PUBLICATIONS

Herrington et al U.S. Appl. No. 60/138,868, Interactive Television Application System with Hand-Held Application Device, Jun. 1999.*

*Primary Examiner*—Chris Kelley
*Assistant Examiner*—Farzana E. Hossain
(74) *Attorney, Agent, or Firm*—Finnegan, Henderson, Farabow, Garrett & Dunner, L.L.P.

(57) ABSTRACT

A system is provided to distribute electronic information contents D0 containing advertisement to a user, and process advertisement information D2 at the user side. This system comprises an information distribution apparatus 19 for distributing advertisement information D2 to the user; and a plurality of information processing apparatuses 8 for receiving and storing the electronic information contents D0 distributed from the information distribution apparatus 19, reading out the electronic information contents D0 according to the user operation, and processing the electronic information contents D2, thereby outputting the advertisement video image and its audio. With this configuration, after receipt of advertisement information, the user can see and hear an advertisement video image or audio freely processed with respect to an advertisement by the information processing apparatuses 8 in unreal time (asynchronously) like playing a game.

In this manner, there can be constructed a electronic advertisement medium which reverses a concept of an advertisement of big four mass media, the advertisement having been supplied one-sidedly conventionally, and which performs an advertisement interactively.

29 Claims, 18 Drawing Sheets

U.S. PATENT DOCUMENTS

| | | | | |
|---|---|---|---|---|
| 6,002,393 | A * | 12/1999 | Hite et al. | 715/719 |
| 6,097,441 | A * | 8/2000 | Allport | 348/552 |
| 6,160,570 | A * | 12/2000 | Sitnik | 725/9 |
| 6,177,931 | B1 * | 1/2001 | Alexander et al. | 725/52 |
| 6,312,336 | B1 * | 11/2001 | Handelman et al. | 463/40 |
| 6,698,020 | B1 * | 2/2004 | Zigmond et al. | 725/34 |
| 6,799,327 | B1 * | 9/2004 | Reynolds et al. | 725/42 |
| 6,993,722 | B1 * | 1/2006 | Greer et al. | 715/739 |
| 7,068,724 | B1 * | 6/2006 | Hamilton | 375/240.26 |
| 2001/0034269 | A1 * | 10/2001 | Lawrence et al. | 463/40 |
| 2002/0095676 | A1 * | 7/2002 | Knee et al. | 725/46 |
| 2002/0171686 | A1 * | 11/2002 | Kamen et al. | 345/850 |
| 2002/0184626 | A1 * | 12/2002 | Darbee et al. | 725/39 |
| 2004/0194131 | A1 * | 9/2004 | Ellis et al. | 725/34 |
| 2005/0010949 | A1 * | 1/2005 | Ward et al. | 725/42 |
| 2005/0108747 | A1 * | 5/2005 | Omoigui | 725/32 |
| 2005/0177861 | A1 * | 8/2005 | Ma et al. | 725/135 |
| 2005/0238056 | A1 * | 10/2005 | Takatori et al. | 370/486 |

FOREIGN PATENT DOCUMENTS

| | | |
|---|---|---|
| WO | WO 00 01149 | 1/2000 |

* cited by examiner

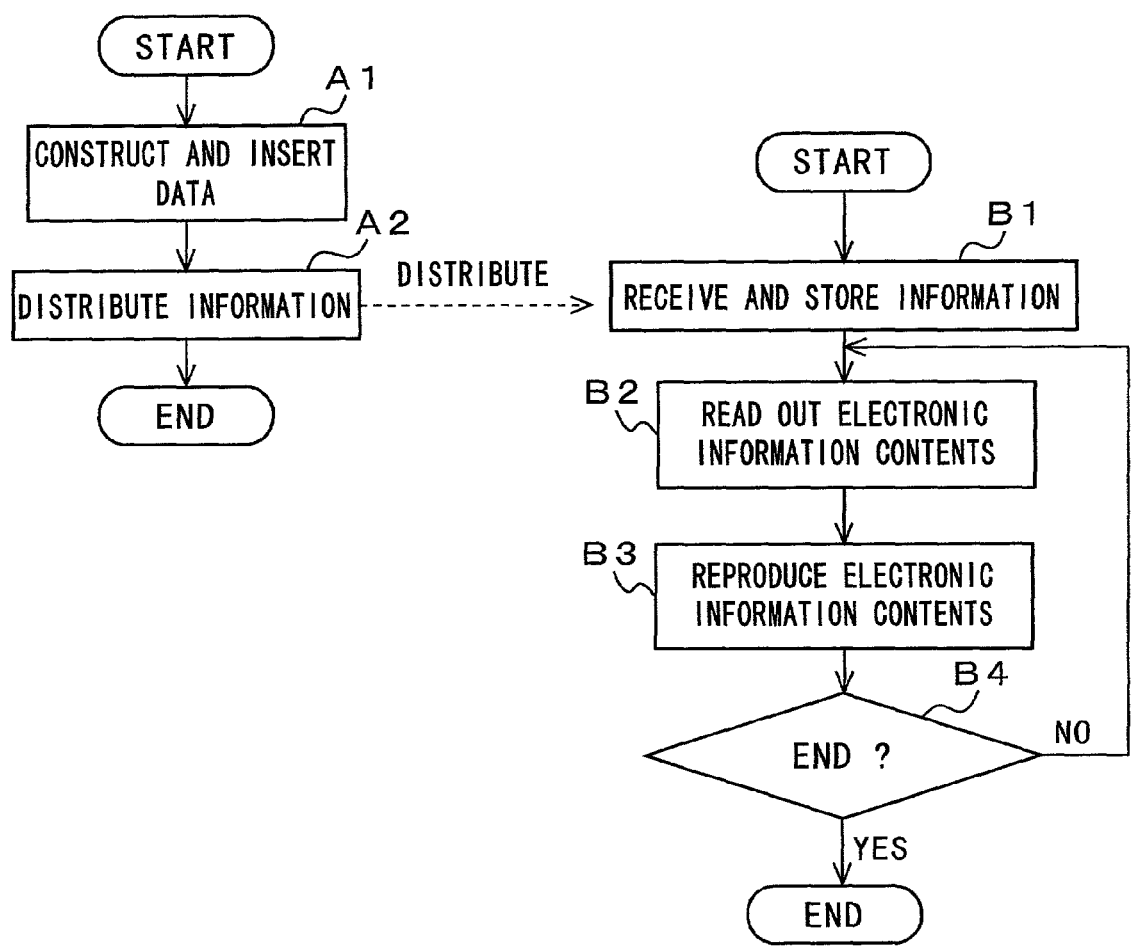
F I G. 2

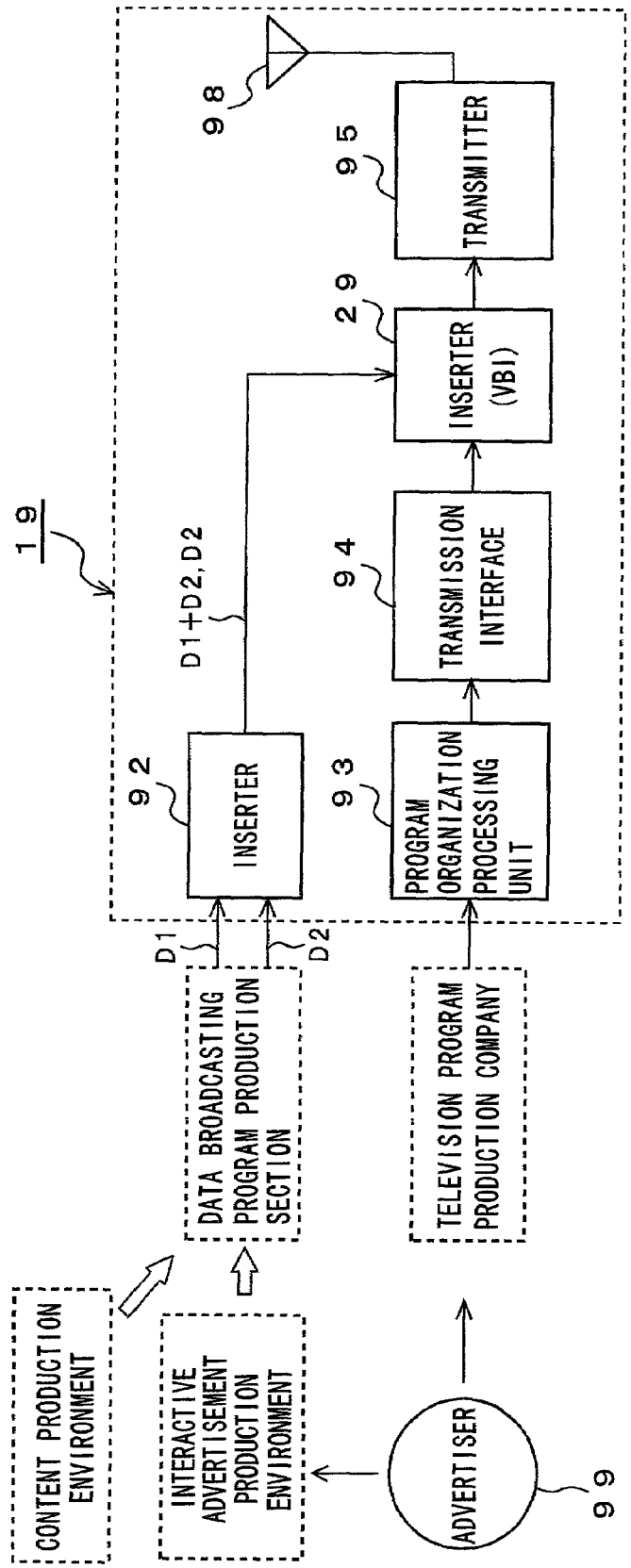
F I G. 5

F I G. 1 1
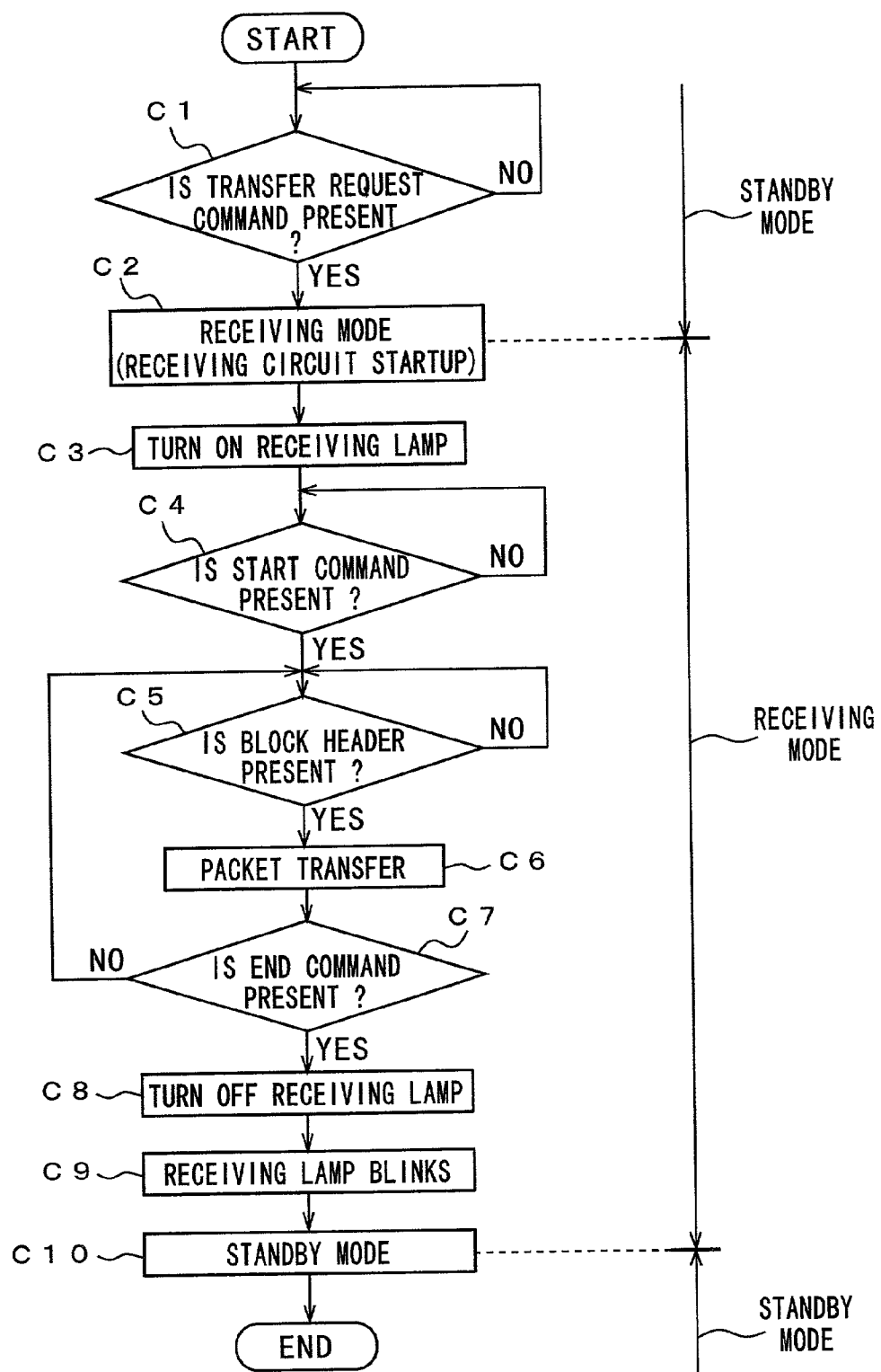

F I G. 1 2
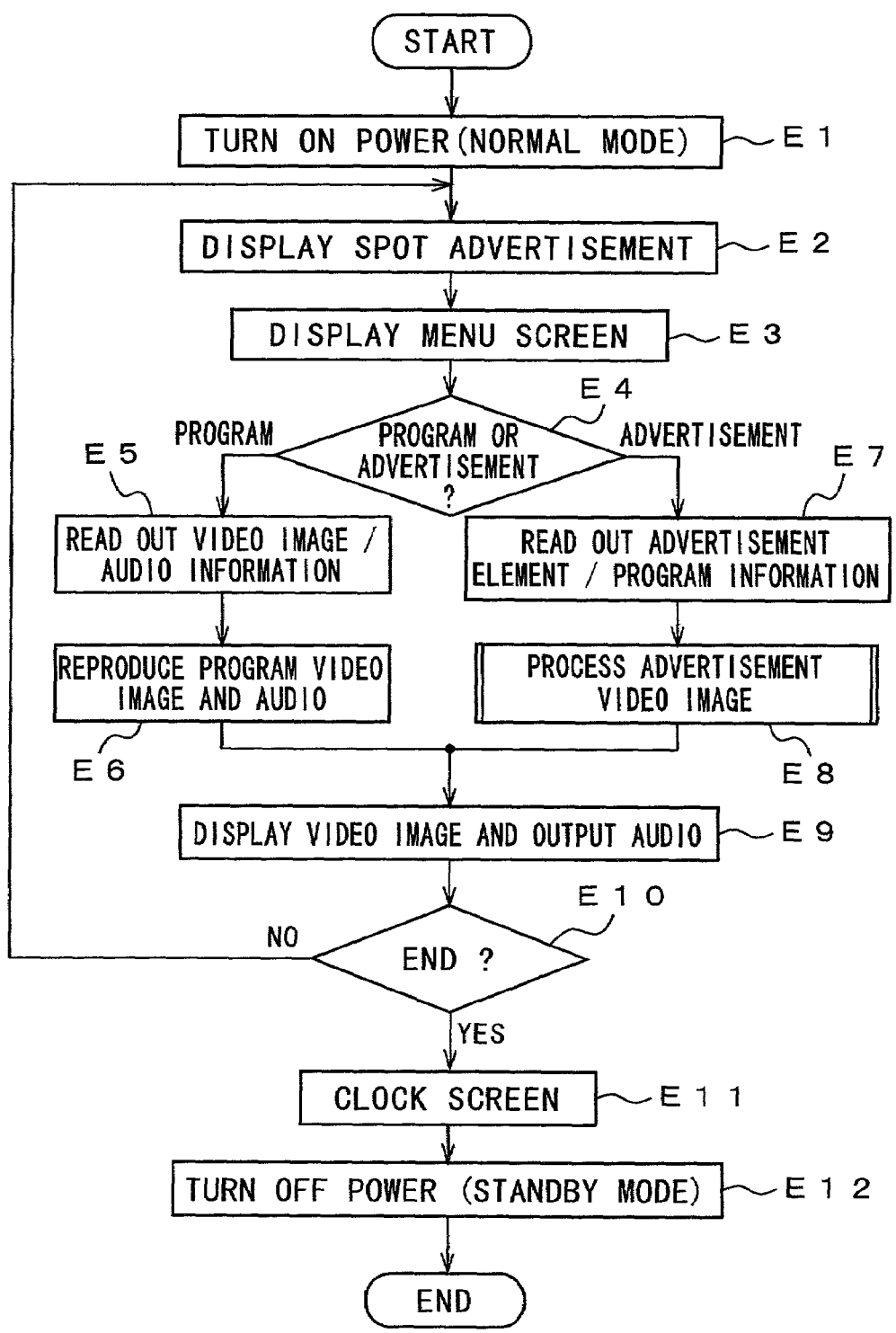

F I G. 1 5
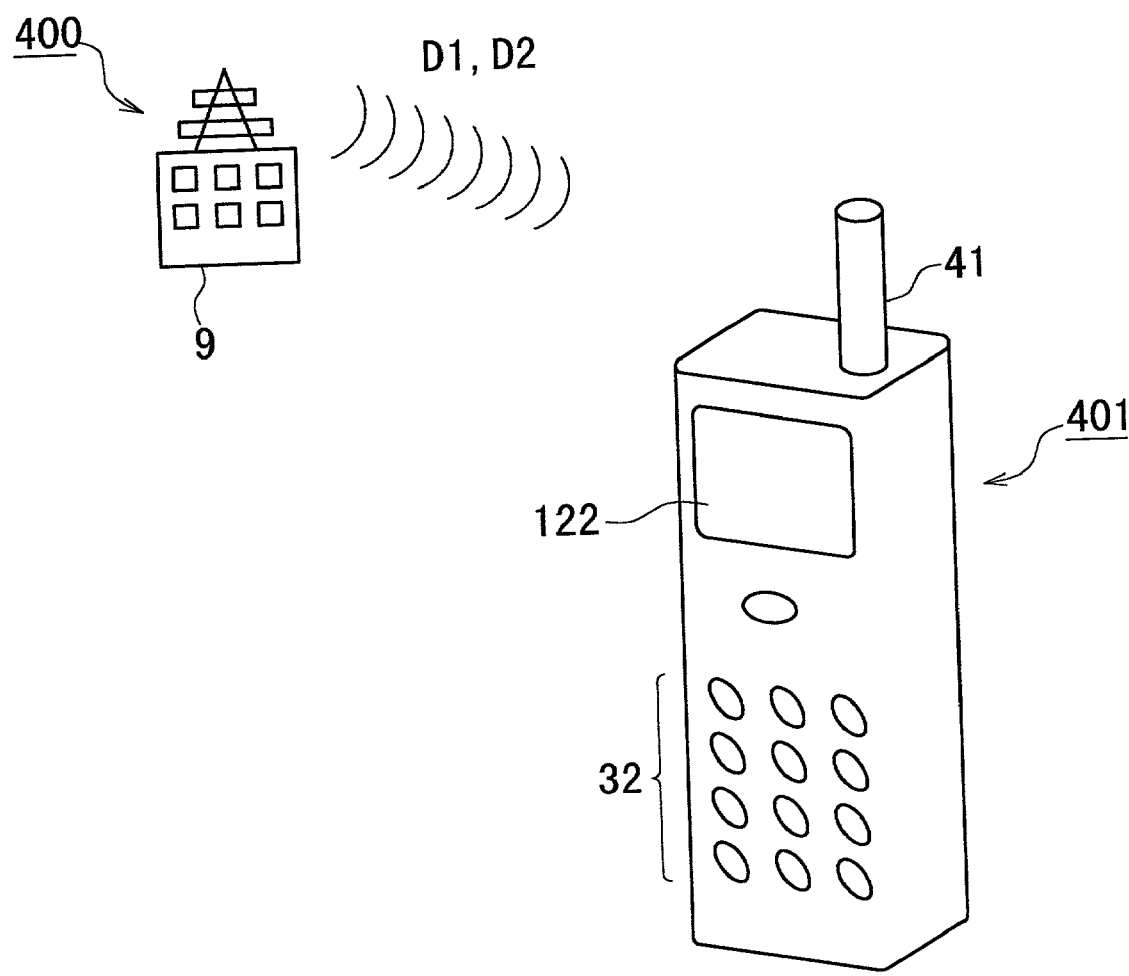

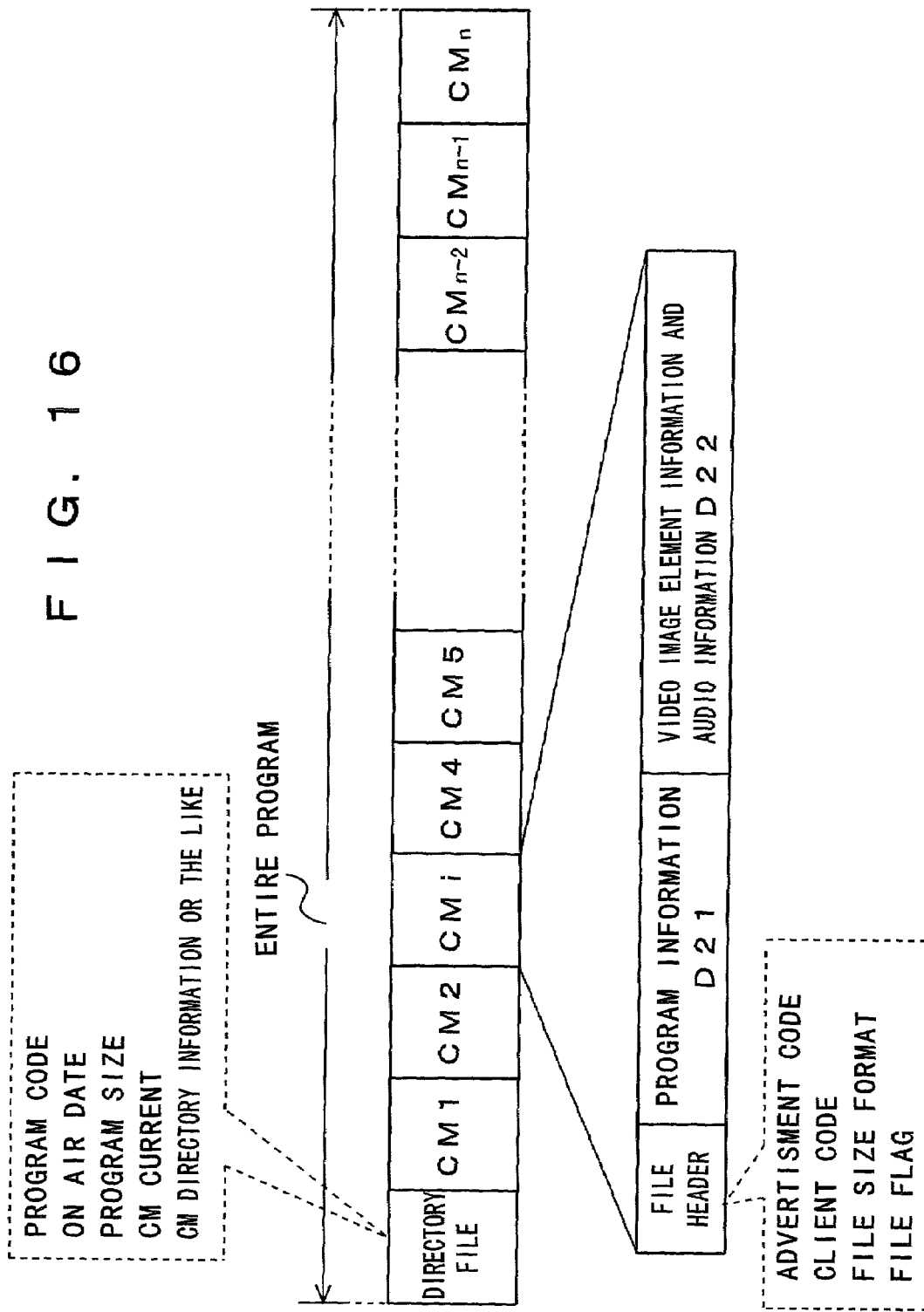

ELECTRONIC INFORMATION CONTENT DISTRIBUTION PROCESSING SYSTEM, INFORMATION DISTRIBUTION APPARATUS, INFORMATION PROCESSING APPARATUS, AND ELECTRONIC INFORMATION CONTENT DISTRIBUTION PROCESSING METHOD

BACKGROUND OF THE INVENTION

1. Field of the Invention

The present invention relates to an electronic information content distribution processing system, an information distribution apparatus, an information processing apparatus, and an electronic information content distribution processing method suitable to interactively operating advertisement contents distributed by broadcasting or communication, and applying such contents to new electronic advertisement media such that a user can enjoy like a game.

2. Description of the Related Art

Conventionally, according to an advertisement system represented by big four mass media such as television, radio, newspaper and journal, a sender supply the contents of advertisement to a receiver one-sidedly. Its advertisement affect is limited to announcement and recognition level of new target products. For a receiver, it is a main object to hear and read a main body of contents, and it is a basic style to attendantly hear or read company products advertisements supplied at add moments, resulting in recognition and understanding of an advertisement target.

Therefore, in the case where an attempt is made to obtain further detailed information on products recognized by this advertisement system, consumers arrange a manufacturer for documents, see actual materials at a store at which such products are present, and search the same product information using another information media again. For example, according to an advertisement system caused by paper media such as newspaper or journal, comparatively detailed product information can be obtained. Product information is only read and seen as advertisement information obtained from such product information.

In addition, according to an advertisement system caused by broadcasting electronics media using television or radio that is one of a high efficiency advertisement system, advertisements are inserted spot-likely between frames of providing programs with high visibility or high interest or a programs (hereinafter, referred to as spot advertisement), thereby making it possible to ensure that many more consumers recognize product information at home.

On the other hand, technical advancement of computer graphics is remarkable, and its high-level expression and compacted, lower-priced reproduction apparatus are also significant. In addition, with the spread of personal computers, a banner advertisement system by internet is used. According to this banner advertisement, concerning an advertisement interested by a consumer further new related home pages can be opened by mouse clicking operation and the search can be easily made by mouse operation.

In the meantime, such advertisement system has the following problems.

<1> According to broadcasting electronic media using television or radio and the like, information is transmitted one-sidedly from an advertiser to a receiver; an advertisement is displayed; and audio is output in real time. Thus, there are often cases in which advertisement information is far away before consumers concentrate their consciousness on such advertisement. In the case where an attempt is made to refer to that advertisement again, advertisement information must be recorded in a recording medium such as a home server in a video tool such as video tape recorded (VTR) or home server.

However, the advertisement system using a recording medium of such type for recording as well is limited to announcement or recognition of new products or company's idea. As in the advertisement system using paper media such as newspaper or journal, the system is limited to reading or seeing level. If a receiver attempts to more deeply understand such new product or company's idea, an additional action such as another medium supervision or actual use experience at a store etc. is required.

<2> According to such broadcasting electronic media, a main object of the receiver is to obtain the broadcasting program contents (content main body) directly irrelevant to the advertisement contents. Thus, the receiver feels resistance when an advertisement irrelevant to the content main body often appears. In addition, when a program is switched to CM, a so called zapping action for switching a channel to another is performed. Thus, there are often cases in which an advertisement effect cannot be obtained for the advertiser's desire. If a advertisement is reduced according to the receiver's quantity, the program cost is reduced. Thus, a "negative spiral" that the quality of content main body itself is lowered.

<3> In addition, according to an advertisement system using Internet, a telephone line is corrected during information search. Thus, the communication charge is increased, and certain time intervals are required for information search. Moreover, the advertisement information obtained via Internet as well, corresponds to a visual/audio level such as reading and seeing, as in the advertisement system of paper media such as newspaper or journal. In order to obtain detailed advertisement information, the corresponding product must be actually seen.

SUMMARY OF THE INVENTION

The present invention has been made to solve such problems. It is an object of the present invention to provide an electronic information content distribution processing system, an information distribution apparatus, an information processing apparatus, and an electronic information content distribution processing method, which reverse a concept of an advertisement which has been supplied one-sidedly, and which is capable of constructing electronic advertisement media for interactively performing an advertisement.

The above mentioned problems are solved by a system of distributing electronic information contents containing an advertisement, and information processing electronic information contents at the user side, said system characterized by comprising:

an information distribution apparatus for distributing said electronic information contents to a user; and a plurality of information processing apparatuses for receiving and storing the electronic information contents distributed from said information distribution apparatus, reading out said electronic information contents according to a user operation, and processing the electronic information contents, and then, outputting an advertisement video image and its audio.

The electronic information content distribution processing system according to the present invention is characterized in that, in the case where electronic information contents containing an advertisement are distributed to a user, and the electronic information contents are information processed at the user side, for example, the electronic information contents are distributed from the information distribution device to the user information processing apparatus by using a specific channel for distributing only the electronic information contents concerning an advertisement. These electronic information contents contain video image element information and audio information concerning an advertisement whose information can be operated in a user; and program information for processing these items of processing. The electronic information contents distributed from this information distribution apparatus are received and stored by an information processing apparatus. Then, electronic information contents are read out according to a user operation, and the electronic information contents are processed by the information processing apparatus, and then, an advertisement video image and audio information are output.

Therefore, after receipt of electronic information contents, the user can see an advertisement video image or hear audio information, the image and audio information freely processed with respect to an advertisement like playing a game in unreal time (asynchronously). In this manner, there can be constructed an electronic advertisement medium reversing the conventional concept of an advertisement caused by bit four mass media, the advertisement being supplied one-sidedly, and capable of interactively performing an advertisement, and a new advertisement mass medium following four mass-communication media can be created.

Moreover, the user can operate an advertisement information medium freely and be enjoyable as compared with an advertisement which the user can only see and hear, the user's interest is increased, and an advertiser can implement an advertisement with its long life and high communication effect.

The information distribution apparatus according the present invention is directed to an apparatus for distributing electronic information contents containing an advertisement, the apparatus comprising: a data inserter for constructing electronic information contents concerning an advertisement in a group of data, thereby inserting the contents into a carrying signal; and a transmitter for transmitting the carrying signal obtained by constructing and inserting the data by this data inserter to a user information processing apparatus.

The information distribution apparatus according to the present invention is featured in that, in the case where electronic information contents containing an advertisement are distributed to a user by using an existing broadcasting infrastructure, for example, electronic information contents concerning an advertisement are constructed in a group of data, and is inserted into a carrying signal by means of a data inserter. The electronic information contents are provided so as to be transmitted by being multiplexed in a vertical blanking period of a television broadcast signal (carrying signal). A television broadcast signal obtained by constructing and inserting the data by this data inserter is transmitted simultaneously from the transmitter to a user's information processing apparatus.

Therefore, in the user's information processing apparatus, a group of data is received within a predetermined period, and can be stored in a storage device in batch. In this manner, after receipt of the electronic information contents, the user can see an advertisement video image and hear audio information, the image and information freely processed with respect to an advertisement by means of the information processing apparatus in unreal time (asynchronously).

The information processing apparatus according to the present invention is directed to an apparatus for information processing electronic information contents containing an advertisement, wherein electronic information contents are received and stored, electronic information contents are read out according to the user operation, and the electronic information contents are processed, and then, outputting an advertisement video image and audio information.

In the information processing apparatus according to the present invention, in the case where electronic information contents containing an advertisement are information processed, for example, upon receipt of the electronic information contents distributed using a specific channel that distributes only electronic information contents concerning an advertisement, the electronic information contents are temporarily stored in a non-volatile storage device or the like. Then, the electronic information contents are read out asynchronously of a receiving operation according to the user operation, and the electronic information contents are arbitrarily information processed. For example, the video image element information and audio information concerning an advertisement are arbitrarily processed by program information according to the user's information operation. The advertisement video image and audio information after thus processed are output.

Therefore, after receipt of electronic information contents, the user can see an advertisement video image or hear audio information, the image and information freely processed with respect to an advertisement in unreal time (asynchronously) like playing a game. In this manner, new game media following an arcade game, home use game machine, hand held game machine or the like. New media in which an entertainment device and advertisement are fused can be created.

An electronic information content distribution processing method according to the present invention is directed to a method for providing a user with electronic information contents containing an advertisement, and information processing electronic information contents at the user side, characterized in that electronic information contents are distributed to the user, the thus distributed electronic information contents are received and stored, the electronic information contents are read out according to the user operation, and an advertisement video image and audio information are reproduced based on the electronic information contents.

In the electronic information content distribution processing method according to the present invention, the user can operate electronic information contents like playing a game, and thus, it can be expected that electronic information contents concerning an advertisement is spread spontaneously in an increased number of users who like to play a game. This contributes to introduction into a demand for a new advertisement industry.

BRIEF DESCRIPTION OF THE DRAWINGS

For a better understanding of the present invention, reference is made to the following detailed description, just in conjunction with the accompanying drawings in which:

FIG. 2 is a flow chart showing an example of processing in the electronic information content distribution processing system 10 embodied according to the present invention;

FIG. 5 is a block diagram depicting an exemplary configuration of an information distribution apparatus 9 and its peripheral system embodied according to the present invention;

FIG. 11 is a flow chart showing an exemplary operation of the tuner device 24 in the interactive advertisement system 200;

FIG. 12 is a flow chart showing an exemplary operation (main routine) of a hand held terminal device 14 in the interactive advertisement system 200.

FIG. 15 is an imaginary view showing an example of configuration of an interactive advertisement system 400 that is a fourth embodiment according to the present invention;

FIG. 16 is an imaginary view showing an example of a format of a data in an advertisement program specific channel;

DESCRIPTION OF THE PREFERRED EMBODIMENT

Now, one embodiment of the electronic information content distribution processing system, information distribution apparatus, information processing apparatus, and electronic information content distribution processing method, will be described with reference to the accompanying drawings.

(1) Embodiments

Figure 1:
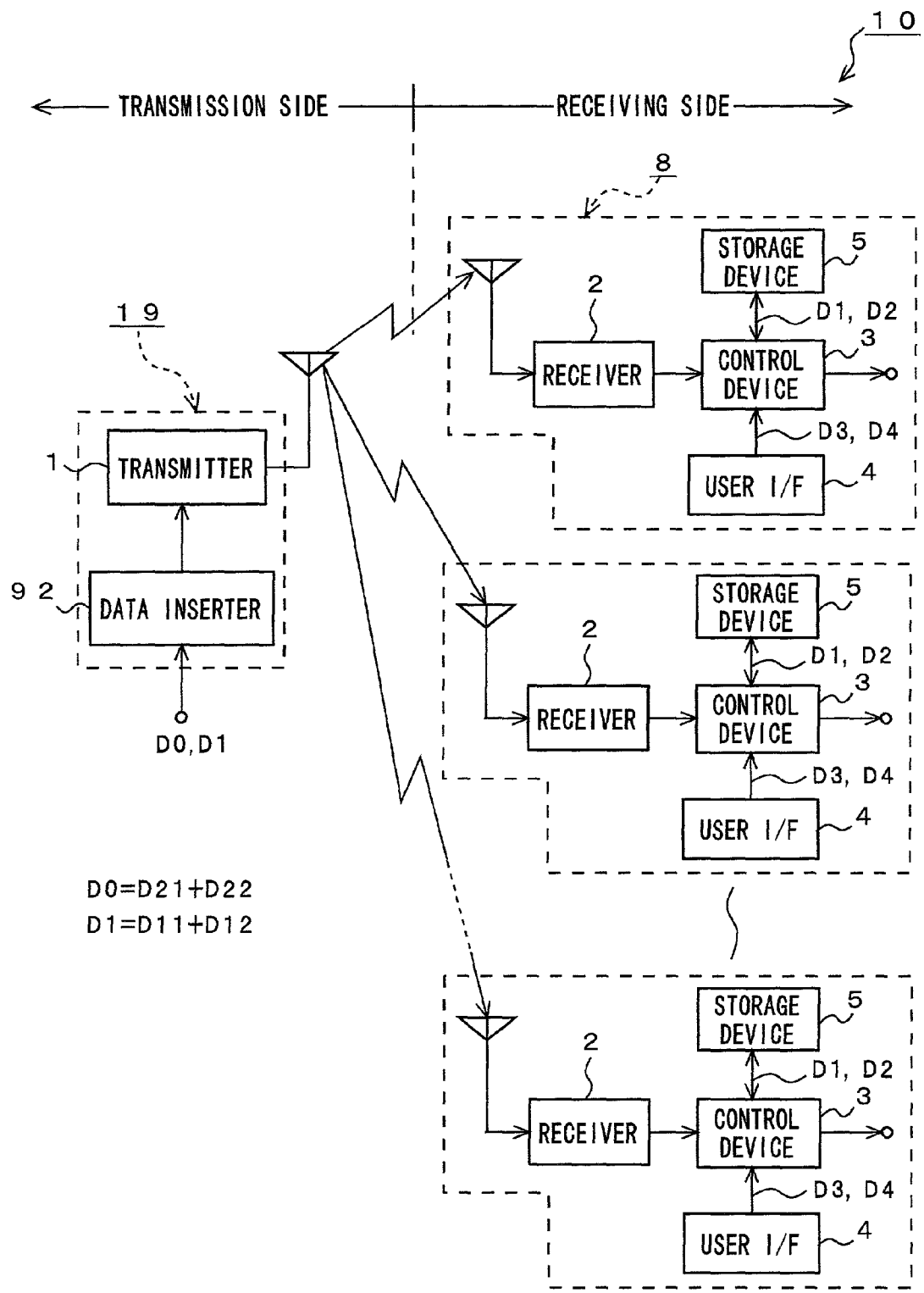
FIG. 1 is a block diagram depicting an exemplary configuration of an electronic information content distribution processing system 10 embodied according to the present invention.

FIG. 1 is a block diagram depicting an exemplary configuration of an electronic information content distribution processing system 10 embodied according to the present invention.

In the present embodiment, this system comprises an information processing apparatus for information processing electronic information contents containing an advertisement, wherein electronic information contents that have been received and stored in advance are read out asynchronously according to a user information operation, and the electronic information contents are processed, and then, outputting an advertisement video image and audio information. In this manner, a concept of an advertisement, the advertisement having been supplied one-sidedly, is reversed, and electronic advertisement media that performs advertisement interactively can be constructed. Further, the user can operate electronic information contents concerning an advertisement freely and feels more enjoyable, the advertisement having been just seen or heard.

The electronic information content distribution processing system 10 shown in FIG. 1 is a system that distributes electronic information contents containing an advertisement to a consumer (hereinafter, referred to user Hj, j=1 to m), and information processes electronic information contents D0 at the user side. The electronic information contents D0 relates to a data on broadcasting program and an advertisement. In this system 10, there is provided an advertisement specific channel for distributing only electronic information contents D0 concerning an advertisement like playing a game.

This is because electronic information contents D0 concerning an advertisement that can be played free is provided to a prospect user Hj who likes to play a game. The electronic information contents D0 contain video image element and audio information D22 concerning an advertisement whose information can be operated; a video image of these items of information D22; and program information D21 for audio processing. The electronic information contents D0 are provided to be distributed to the user Hj by using a current broadcasting infrastructure or a communication infrastructure.

In the case where a broadcasting infrastructure, for example, is used in the electronic information content distribution processing system 10, an information distribution apparatus 19 is provided at a broadcast station or the like, and the electronic information contents D0=D21+D22 is distributed to the user. The information distribution apparatus 19 is provided to distribute electronic information contents D0 concerning an advertisement through an advertisement specific channel that has been assigned in advance. At this information distribution apparatus 19, at least a data inserter 92 and a transmitter 1 are provided.

In the case where an advertisement specific channel is used, a plurality of electronic information contents D0 concerning an advertisement are constructed in a group of data at the data inserter 92. In the case where the electronic information contents D0 concerning an advertisement are mixed at the data broadcast program channel, broadcast information contents D1 concerning an arbitrary data broadcasting program and electronic information contents D0 concerning an advertisement are constructed at the data inserter 92 in a group of data. The broadcast information contents D1 are composed of audio information D11 and video image information D12 concerning an arbitrary data broadcasting program (D1=D11+D12).

A transmitter 1 is connected to this data inserter 92, and the data are multiplexed, for example, in a free space such as vertical blanking period of a television broadcast signal adopted by an existing broadcasting infrastructure, then transmitted to the information processing apparatus 8 of the user Hj. Namely, in the case where an advertisement specific channel is used, electronic information contents D0=D21+ D22 are transmitted. In the case where a data broadcasting program channel is used, electronic information contents D0+broadcast information contents D1 are transmitted.

In this system 10, information processing apparatuses 8 are provided to a plurality of users Hj. The electronic information contents distributed from an information distribution apparatus 19 are received and stored, the electronic information contents are read out asynchronously according to a user operation, and the advertisement video image and audio information obtained after the electronic information contents have been arbitrarily processed are output.

Namely, a receiver 2 is provided at an information processing apparatus 8, and a group of data (electronic information contents D0) transmitted from a transmitter 1 of the information distribution apparatus 19 is received. A control device 3 is connected to the receiver 2, and a non-volatile storage device (memory) 5 is connected to this control device 3. The electronic information contents D0 received by the receiver 2 is stored (saved) in memory 5. Although the information processing apparatus 8 will be described in each embodiment, an entertainment device comprising a receiving function, a tuner device and hand held terminal device combined with the receiver 2 and memory 5, and a hand held telephone set comprising a tuner function are configured.

A user interface 4 is connected to this control device 3. In this control device 3, electronic information contents D0 are read out from a storage device 5 according to operation inputs passed through user interface 4, and electronic information contents D0 are information processed so as to display and control an advertisement video image. For example, video image element and audio information D22 concerning an advertisement is arbitrarily video imaged and audio processed based on program information D21 read out from the memory 5. Alternatively, a data broadcasting program is reproduced based on the broadcast information contents D1.

Items of operation inputs D3 and D4 concerning electronic information contents D0 are provided as input through user interface 4 connected to this control device 3. They are intended to control input/output of the control device 3 and receiver 2. They are generated by free operation of operating unit such as controller, by the user Hj. The broadcast information contents D1 and electronic information contents D0 concerning an advertisement are read out from the memory 5 based on this operation information D3.

In addition, an interactive advertisement video image processed by the control device 3 based on operation input D4 or a reproduced data broadcasting program is displayed on a monitor or the like (not shown). For example, in the case where a data broadcasting program channel is selected, the electronic information contents D0 and broadcast information contents D1 are already downloaded on the memory 5. Before displaying the reproduced data broadcasting program, a spot advertisement is displayed on the monitor based on video image element and audio information D22. In addition, when the data broadcasting program is ended, a spot advertisement based on these items of information D22 is displayed.

Further, in this system 10, when a spot advertisement video image is displayed, a control program is executed such that the user can select whether or not to set a program reproduction mode or to set an interactive advertisement operating mode. Here, the program reproduction mode denotes an operation for reproducing broadcasting information contents D1 according to a data broadcasting program. The interactive advertisement operating mode denotes an operation for video imaging and audio processing the video image element and audio information D22 based on items of operation inputs D3 and D4 through the user interface 4 and program information D21.

In the case where the interactive advertisement operating mode is selected, for example, program information D21 and the video image element and audio information D22 are read out from the memory 5 based on the operation input D3 passed through user interface 4. Then, these items of information D22 are video imaged and audio processed based on the program information D21 and operation input D4. Then, a two-dimensional video image or a three-dimensional vide image concerning a least significant hierarchy of the display contents of a spot advertisement video image is displayed on a monitor based on the video image processing.

In addition, in the case where an advertisement specific channel is selected, a plurality of electronic information contents D0=D21+D22 are already downloaded on the memory 5. When electronic information contents D0 concerning an arbitrarily selected advertisement are read out from a plurality of electronic information contents D0 downloaded on the memory 5, the control device 3 is executed to reproduce video image element and audio information D22 based on the electronic information contents D0, and is executed to display and control an advertisement video image that consists of a three-dimensional video image.

In this system 10, a priority is set in advance to any of the electronic information contents downloaded from the advertisement specific channel. Here, the priority denotes contents frequently displayed prior to any other advertisement video image. Although the advertisement fee is higher than that of another, there are more chances in which the user Hj sees and hears.

In this system 10, for example, before displaying an advertisement video image to which a priority is not set or an advertisement video image with a low priority, an advertisement video image to which such priority is set or an advertisement video image with a high priority is always displayed in an initial screen in order to cause the user Hj to see and hear it frequently. After ending the display of an advertisement video image to which a priority is not set or an advertisement video image with a low priority, an advertisement video image to which such priority is set or an advertisement video image with a high priority may be displayed.

Further, when an advertisement video image to which a priority is set is displayed or after that, a control program may be executed so as to display a menu screen and select an arbitrary electronic information contents D0 among the electronic information contents D0 concerning a plurality of advertisements. The user Hj can select electronic information contents D0 concerning an advertisement in desired categories.

Now, an example of processing of the electronic information content distribution processing system 10 embodied according to the present invention will be described here.

In an example of the present embodiment, assume a case in which electronic information contents D0 containing an advertisement are provided to a user using an existing broadcasting infrastructure or communication infrastructure, and the electronic information contents D0 are information processed at the user side. The electronic information contents D0 concerning an advertisement assumes a case in which an advertisement specific channel and a data broadcasting program channel are provided.

<1> In the case of an advertisement specific channel First, at the transmission side, at the step A1 concerning a flowchart shown in FIG. 2, the video image element and audio information D22 concerning an arbitrary interactive advertisement and program information D21 for video imaging and processing these items of information D22 are constructed in a group of data at the data inserter 92. The contents of interactive advertisement contain a variety of electronic information contents D0 including commodities such as electric products, automobile, cosmetics, foods, game software; and real estates such as apartments or housings or the like. The electronic information contents D0 consists of video image element information such as graphic data or sound data and audio information D22; and program information D21 such as application.

These electronic information contents D0 are provided in advance by an interactive advertisement production environment, and are carried into a data broadcasting program production section. In this production section, video image element and audio information D22 concerning a plurality of advertisements; and program information D21 are constructed in a series of data.

Next, at the step A2, data are distributed from the transmission side to the receiving side by using an existing broadcasting infrastructure or communication infrastructure. For example, in the case where data are distributed by the broadcast infrastructure, an advertisement specific channel is used. Namely, data are transmitted to be multiplexed from the transmitter 1 of the information distribution apparatus 19 to the information processing apparatus 8 of the user Hj by using a vertical blanking period of a TV broadcast signal caused by a terrestrial wave broadcast. In the future, it is possible to directly multiplex the data to a television broadcast signal according to a broadcast form which will be newly adopted.

On the receiving side, a group of data sent from the information distribution apparatus 19 is received by the receiver 2 of each information processing apparatus 8 at the step B1. These data are stored (downloaded) on a nonvolatile memory 5 or the like. Then, processing goes to the step B2 at which the video image element and audio information D22 and the program information D21 are read out asynchronously from the memory 5 according to information operation of the user Hj. At this time, the user Hj operates operating unit such as controller to provide operation input D4 for the control device 3. Then, at the step B3, advertisement video image and its audio are reproduced by the control device 3 based on the operation input D4 and electronic information contents D4. At this time, based on the program information D21 read out from the memory 5 to the control device 3, the video image element and audio information D22 are video imaged and processed by the control device 3.

In this system 10, the video image element and audio information D22 are video imaged and processed. In this way, an advertisement vide image to which a priority is set or an advertisement video image with a high priority is produced so as to be always displayed on an initial screen before displaying an advertisement video image to which a priority is not set or an advertisement video image with a low priority with respect to an interactive advertisement, in order to ensure the user Hj sees and hears such advertisement frequently. The advertisement video image is produced so as to operate a two-dimensional video image or a three-dimensional video image concerning a lower hierarchy of the display contents of a spot advertisement like playing a game.

Further, when an advertisement video image to which a priority is set is displayed or after that, a menu screen is displayed, and a control program is executed such that the user can select arbitrary electronic information contents D0 from among the electronic information contents D0 concerning a plurality of advertisements. Here, the user Hj is prompted to select electronic information contents D0 concerning an advertisement in a desired category. In this manner, an advertisement video image with a low priority or an advertisement vide image to which a priority is not set is displayed.

Next, at the step B4, it is judged whether or not an interactive advertisement is ended. This judgment is made by the user. In the case whether the advertisement is ended, for example, the power is turned OFF to end. In the case where these processing functions are not ended, processing goes to the step B2, for example, at which an advertisement video image to which a priority is set or an advertisement vide image with a high priority is displayed again.

Figure 3:
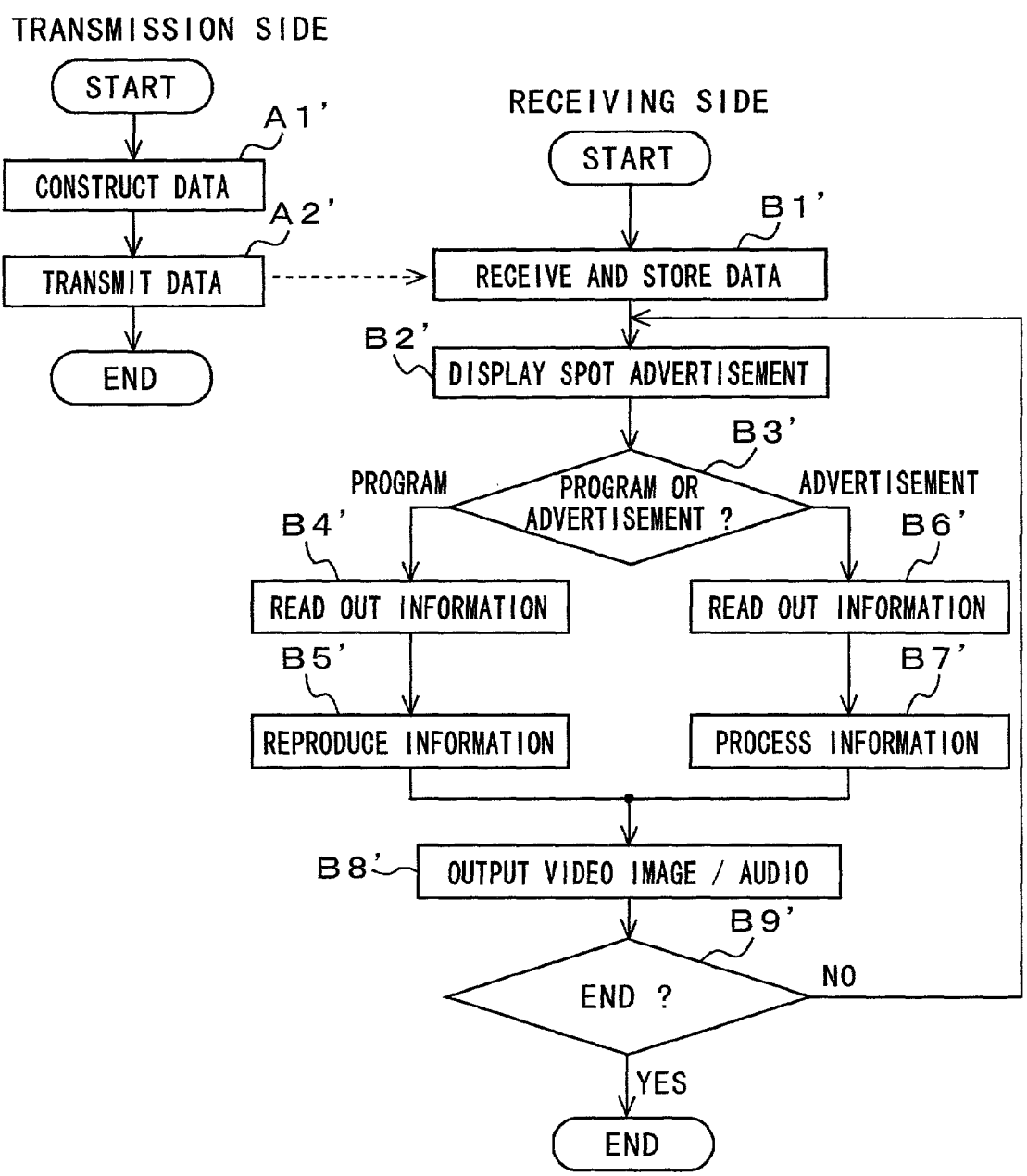
FIG. 3 is a flow chart showing another example of processing in the electronic information content distribution processing system 10 embodied according to the present invention.

<2> In the case of a data broadcasting program channel First, at the transmission side, at the step A1' of the flow chart shown in FIG. 3, there are constructed in advance in a group of data; broadcast information contents (video image and audio information) D1 concerning an arbitrary data broadcasting program; video image element and audio information D22 concerning an arbitrary interactive advertisement; and program information D21 for video imaging and processing these items of information D22. As is the case of an advertisement specific channel, an interactive advertisement denotes contents that can be played like a game provided in advance in accordance with the interactive advertisement production environment.

Next, at the step A2', data are distributed from the transmission side to the receiving side by using an existing broadcasting infrastructure or communication infrastructure. For example, data are transmitted to be multiplexed by using a vertical blanking period of a TV broadcast signal caused by a terrestrial wave broadcast.

At the step B1', a group of data are received on the receiving side by means of a receiver 2. These data are downloaded on a non-volatile memory 5 or the like. Then, processing goes to the step B2' at which a spot advertisement concerning an interactive advertisement is always displayed at the beginning of a data broadcasting program. Then, the step goes to the step B3' at which a control program is executed such that the user can select whether to set a program reproduction mode or an interactive advertisement operating mode.

Here, in the case where the program reproduction mode is selected, processing goes to the step B4' at which the broadcast information contents D1 according to a data broadcasting program are read out from the memory 5 to the control device 3. Then, processing goes to the step B5', at which these broadcast information contents D1 are reproduced by the control device 3.

In addition, in the case where the interactive advertisement operation mode is selected at the step B3', processing goes to the step B6' at which the program information D21 and the video image element and audio information D22 are read out from the memory 5 to the control device 3. Then, processing goes to the step B7' at which the video image element and audio information D22 is video imaged and processed by the control device 3 based on the operation input D4, passed through the user interface 4 from the operating unit such as controller at which the user Hj operates freely and the program information D21 read out from the memory 5.

In the present embodiment, the video image element and audio information D22 is video imaged and processed. In this way, a two-dimensional video image or a three-dimensional video image concerning a least significant hierarchy of the display contents of a spot advertisement concerning an interactive advertisement can be operated like playing a game. Then, at the step B8', an interactive advertisement or a data broadcasting program is provided to be displayed on a monitor or the like. Then, at the step B9', it is judged whether or not to end the program reproduction mode or the interactive advertisement operating mode and the like. This judgment is made by the user.

In the case where these modes are ended, the power is turned OFF, for example. In the case where these modes are not ended, processing goes to the step B2' at which a spot advertisement concerning an interactive advertisement is displayed based on the video image element and audio information D22 before displaying a data broadcasting program. It should be noted that when the data broadcasting program is ended, a spot advertisement may be displayed based on the video image element and audio information D22.

In this manner, in the electronic information content distribution processing system 10 embodied according to the present invention, any time after receipt of the electronic information contents D0, the user can see an advertisement video image or hear audio information, the image and information being freely processed with respect to an advertisement, by the information processing apparatus 8, like playing a game, in unreal time (asynchronously). Thus, a concept of an advertisement caused by big four mass media, the advertisement having been supplied one-sidedly, is reversed, whereby an electronic advertisement medium that performs an advertisement interactively can be constructed, and a new advertisement mass media following such big four mass communication media can be created.

Moreover, an advertisement specific channel that distributes only electronic information contents D0 concerning an advertisement is used instead of an advertisement which the user only sees and hears. Thus, the user can download such advertisement at any time he or she likes, and can operate video image element and audio information D22 concerning an advertisement freely and feels more enjoyable. In this manner, the user's interest is increased, and an advertiser can implement an advertisement with its long life and high advertisement effect. The user can handle a commodity virtually, and then, a high advertisement effect can be expected.

Therefore, this makes it possible to contribute to the introduction into a demand for a new advertisement industry. Hereinafter, embodiments of four interactive advertisement systems 100, 200, 300 and 400 will be described. In the case where an advertisement specific channel is used, the electronic information contents D0 consist of program information D21 and video image element and audio information D22. Thus, the contents are generally referred to as interactive advertisement specific program information (hereinafter, simply referred to as advertisement information D2).

(2) First Embodiment

Figure 4:
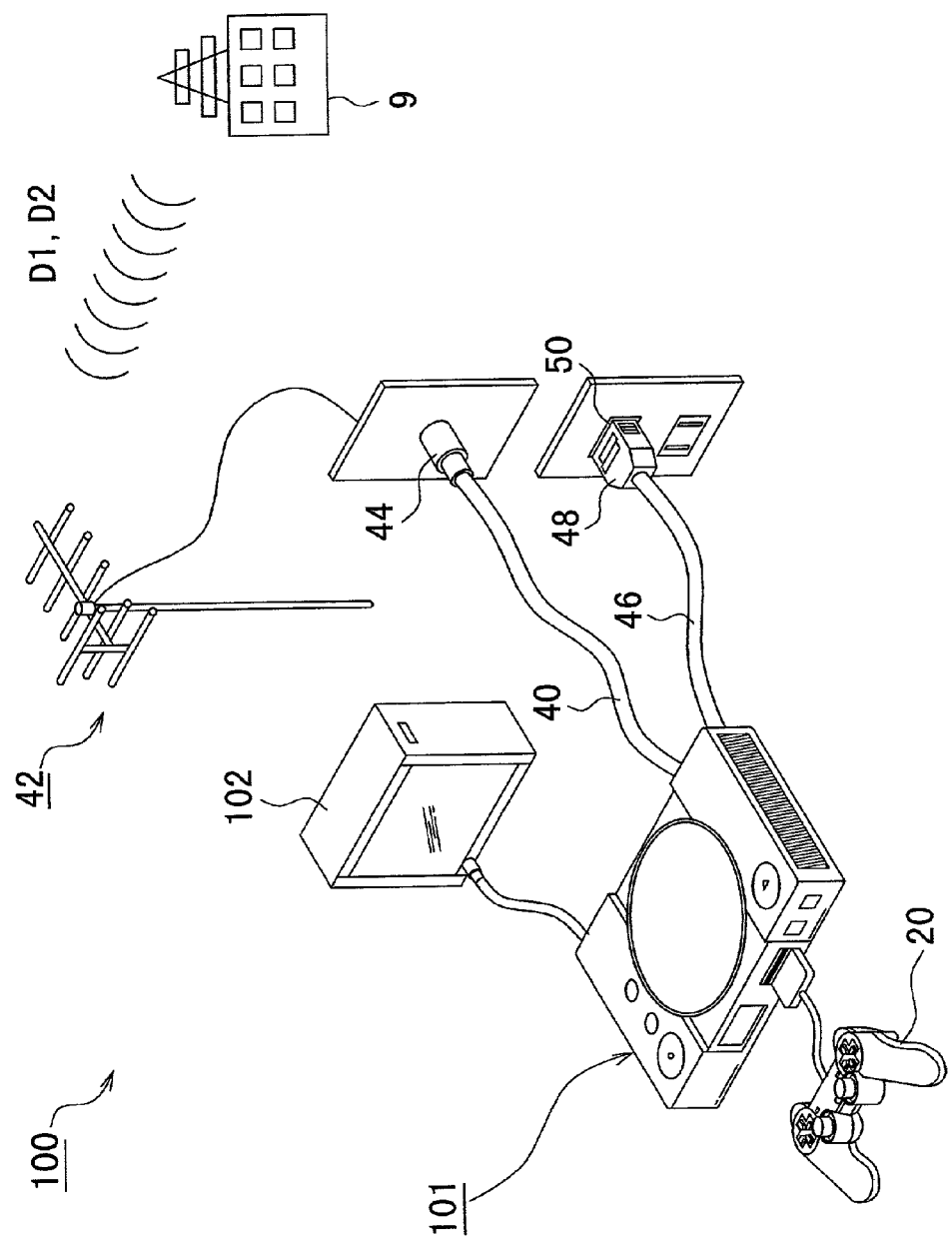
FIG. 4 is a imaginary view showing an exemplary configuration of an interactive advertisement system 100 that is a first embodiment according to the present invention.

FIG. 4 is an imaginary view showing an exemplary configuration of an interactive advertisement system 100 according to a first embodiment of the present invention.

A interactive advertisement system 100 shown in FIG. 4, is equipped with a tuner incorporated entertainment device 101 that is an example of an information processing apparatus and a television 102 that is an example of the monitor device. The entertainment device 101 is an example of a composite processing apparatus, wherein electronic information contents concerning an advertisement (hereinafter, referred to as advertisement information D2) and broadcast information contents D1 are received and stored.

A coaxial cable 40 is connected to an entertainment device 101 to reach a coaxial terminal 44. An aerial wire antenna 42 is connected to this coaxial terminal 44, so that advertisement information D2 concerning a data broadcasting program and an interactive advertisement as well as TV program broadcast caused by a general terrestrial wave are received. In addition, an AC plug (alternating current plug) 48 to which power code 46 is connected is provided at the entertainment device 101. The AC plug is connected to a power receptacle 50, and a commercially available power (also simply referred to as AC power supply) is supplied.

An interface function and a storage device are further provided at this entertainment device 101, and a group of data (D1, D2) from a broadcast station 9 are received, and stored in a non-volatile storage device. An external controller 20 is connected to this interface. In addition, the data is read out from the storage device to perform video imaging and processing. In this example, the external controller 20 is used so that the user can operate an interactive advertisement freely.

A television 102 that is an example of a monitor device can be connected to this interface. Then, the electronic information contents D2 or broadcast information contents D1 are read out from the entertainment device 101 according to information operation of the user Hj, and an advertisement video image and its audio are output after the electronic information contents D2 or broadcast information contents D1 have been information processed asynchronously. For example, an interactive advertisement video imaged and processed by the entertainment device 101 or reproduced data broadcasting program are displayed on a television screen. An exemplary internal configuration of the entertainment device 101 will de described in FIG. 8.

In this example, the advertisement information D2 according to the present invention together with a data broadcasting program being contents is broadcasted from the broadcast station 9 for home of a general user, and is received by the information processing apparatus 8 via antenna of each home. Then, a data broadcasting program or interactive advertisement is displayed on a television 102 or a monitor in unreal time (asynchronously) relevant to the broadcast station 9.

In addition to a specific console such as the above mentioned entertainment device 101, a home use game machine capable of plugging in a tuner function or a personal computer and the like may be used for the information processing apparatus. For a display device, there may be used an integration type hand held terminal device that incorporates a tuner function in addition to an existing television 102 or a personal computer monitor. Further, the external controller 20 may be of wireless type using infrared ray or electric wave in addition to wired type generally used for a home use game machine or may be compatible with a remote control function generally used for a television 102 or a video recorder.

Now, an information distribution apparatus 19 disposed at a broadcast station 9 or the like responsible for information distribution will be described below. FIG. 5 is a block diagram depicting an exemplary configuration of an information distribution apparatus 19 and its peripheral environment embodied according to the present invention. In this example, a data broadcasting infrastructure for sending data by using an analog terrestrial wave VBI is used for television broadcasting.

The information distribution apparatus 19 shown in FIG. 5 is an apparatus that distributes advertisement information D2 concerning a data broadcasting program and an interactive advertisement as well as a TV program broadcast caused by general terrestrial waves. In this example, a client such as company asks a commercial (hereinafter, simply referred to CM) production company having interactive advertisement production environment for CM production directly or through advertisement agent.

Through the inquiry of an advertiser 99, advertisement information D2 concerning interactive advertisement including commodities such as electric products, automobiles, cosmetics, foods, game software; and real estates such as apartments or housings is produced in advance in accordance with an interactive advertisement production environment, and many interactive advertisements after completed are brought into a data broadcast advertisement program production section. In this section, broadcast information contents D1 concerning a data broadcasting program; video image element and audio information D22 such as graphic data or sound data concerning an interactive advertisement; advertisement information D2 consisting of program information D21 such as application are organized in accordance with a CM table scheduled in advance.

A general terrestrial television program is produced by a television program production company as usual, and another advertiser 99 asks a so called commercial (CM) video to be supplied at an interval of such television program. A complete packet program produced by a television program production company is organized in accordance with a program table in a television station, and is broadcasted after transmission processing has been done. Namely, the information distribution apparatus 19 comprises an inserter 92 for inserting a data broadcasting program; interface 94; a program organization processing unit 93 for a general television program; interface 94; a transmitter 95; and an antenna 98.

This inserter 92 is provided as an example of a data inserter. This interface 92 is provided to construct at least broadcast information contents D1 concerning a data broadcasting program D1; video image element and audio information D22 such as graphic data or sound data concerning an interactive advertisement; and program information D21 such as application in a group of data, and to transfer these data to an inserter 29.

On the other hand, television program information and commercial video caused by a terrestrial broadcast are provided by a television program production company. The television program information and commercial video are sent to a transmission interface 94 after organized by a program organization processing unit 93 of an information distribution apparatus 19. In the transmission interface 94, the program organized television program information and commercial video are converted into a predetermined broadcast format, and then, the converted data is provided as a TV broadcast signal caused by terrestrial wave broadcast (carrying signal).

An inserter 29 is connected to an output stage of this transmission interface 94, and a transmitter 95 is connected to its next stage. In a vertical blanking period, for example, of the above mentioned TV broadcast signal, the broadcast information contents D1 concerning a data broadcasting program and advertisement information D2 concerning an interactive advertisement are arranged in a group of data, and are multiplexed (VBI). This insertion is arranged to be performed at midnight. A group of data inserted into this inserter 29 is irradiate from an antenna 98 simultaneously by means of predetermined distribution power after the data has been modulated at the transmitter 95 by means of a predetermined modulation system.

In this manner, the broadcast information contents D1 or advertisement information D2 concerning an interactive advertisement can be broadcast from the broadcast station 9 to the user's entertainment device 101. Of course, the advertisement information D2 is provided so that the information may be distributed to the user Hj through an advertisement specific channel that has been assigned in advance (refer to fourth embodiment). In this case, this interactive broadcast is irrelevant to an interactive advertisement broadcast using the contents main body and data broadcast of a terrestrial waves in contents. This means that the same distribution infrastructure is used for a totally irrelevant receiving system.

Therefore, in the entertainment device 101 with a tuner function, possessed by a user and a hand held terminal device as described later, a group of data can be received simultaneously in a predetermined period of time, and can be stored in batch in a storage device or the like. In this manner, after receipt of such data, the user reads out data from the storage device at any time he or she likes; video images and audio processes video image element and audio information D22 based on program information D21 in unreal time (asynchronously) irrespective of a television broadcast time; reproduces broadcast information contents D1 according to a data broadcasting program; displays a data broadcasting program such as interactive advertisement or animation on a television 102, thereby making it possible to see and hear it freely.

Figure 6:
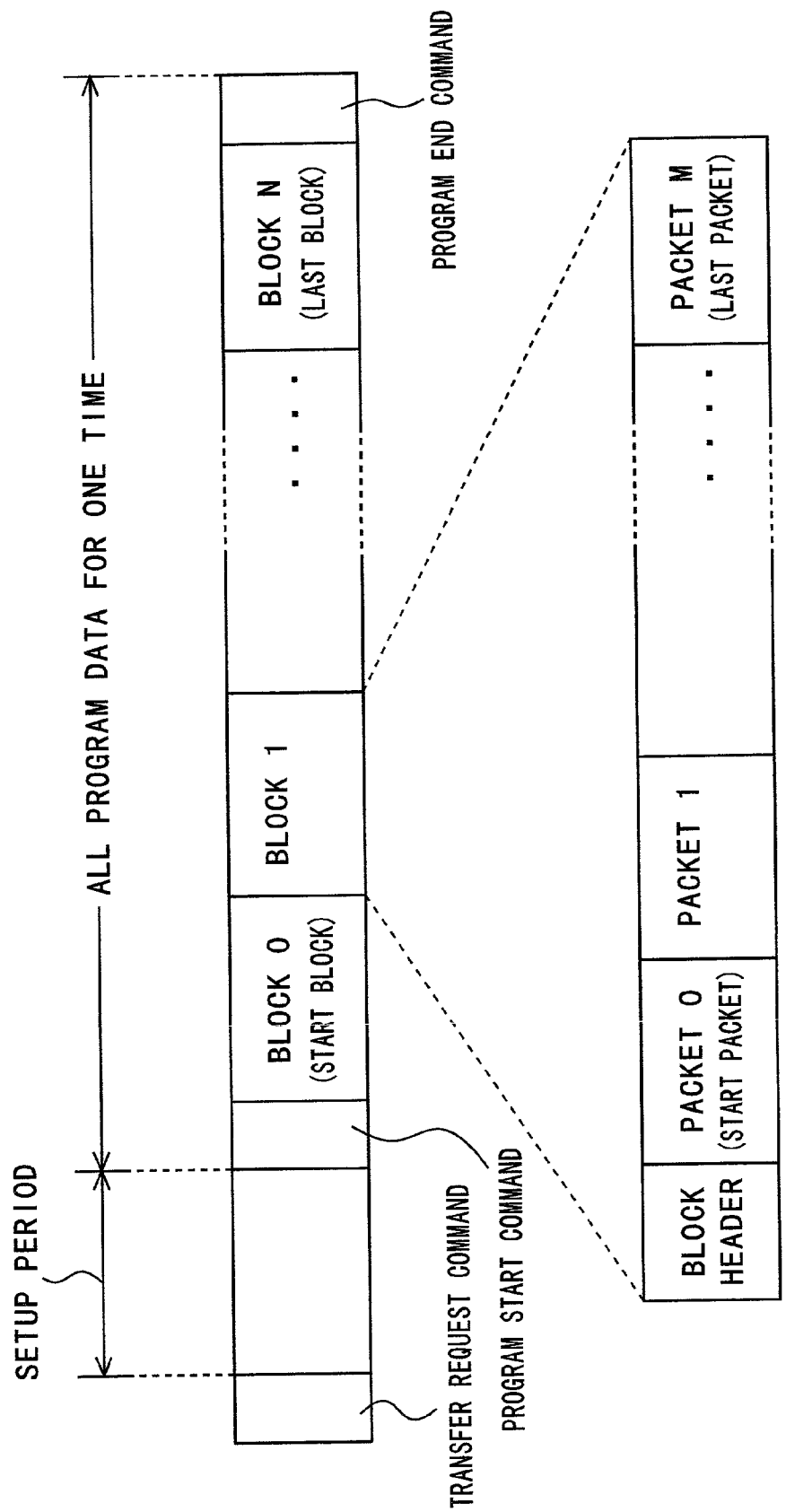
FIG. 6 is an imaginary view showing an example of a format of a data.

Now, a format of data of program information D21, video image element and audio information D22 will be described here. With respect to the data shown in FIG. 6, a format is provided in advance at a broadcast station 9 or the like, and the data main body is transmitted to be divided into each packet.

In this example, a transfer request command is described at the beginning of data so as to enable automatic receiving in a tuner device 101 even at midnight. The transfer request command is data for initializing (starting up) a tuner device 101 in a standby state. A dummy packet following this transfer request command is inserted. The dummy packet is provided to form a setup period. The setup period is a time required for the tuner device 101 to be receivable.

A set of program data is all described after this setup period. Program data is described in a bit data format, and broadcast information contents D1 concerning a data broadcasting program and advertisement information D2 concerning an interactive advertisement are targeted. Program data is nominally described without being discriminated from interactive advertisement or program codes, video images, or audio information.

A program start command is described at the beginning of the program data, and N+1 blocks 0 to N are described subsequently. Advertisement information D2 concerning the above mentioned interactive advertisement or program codes and content codes of broadcast information contents D1 are described in units of blocks. Block 0 is a start block, and block N is a last block. Following block N, a block last command is described. A block header is described at the beginning of each of blocks 0 to N, for example, block 1. Header codes, attributes such as the start, middle, and end of the block, block length such as the number of packets, content codes or the like are described at each block header.

Figure 7:
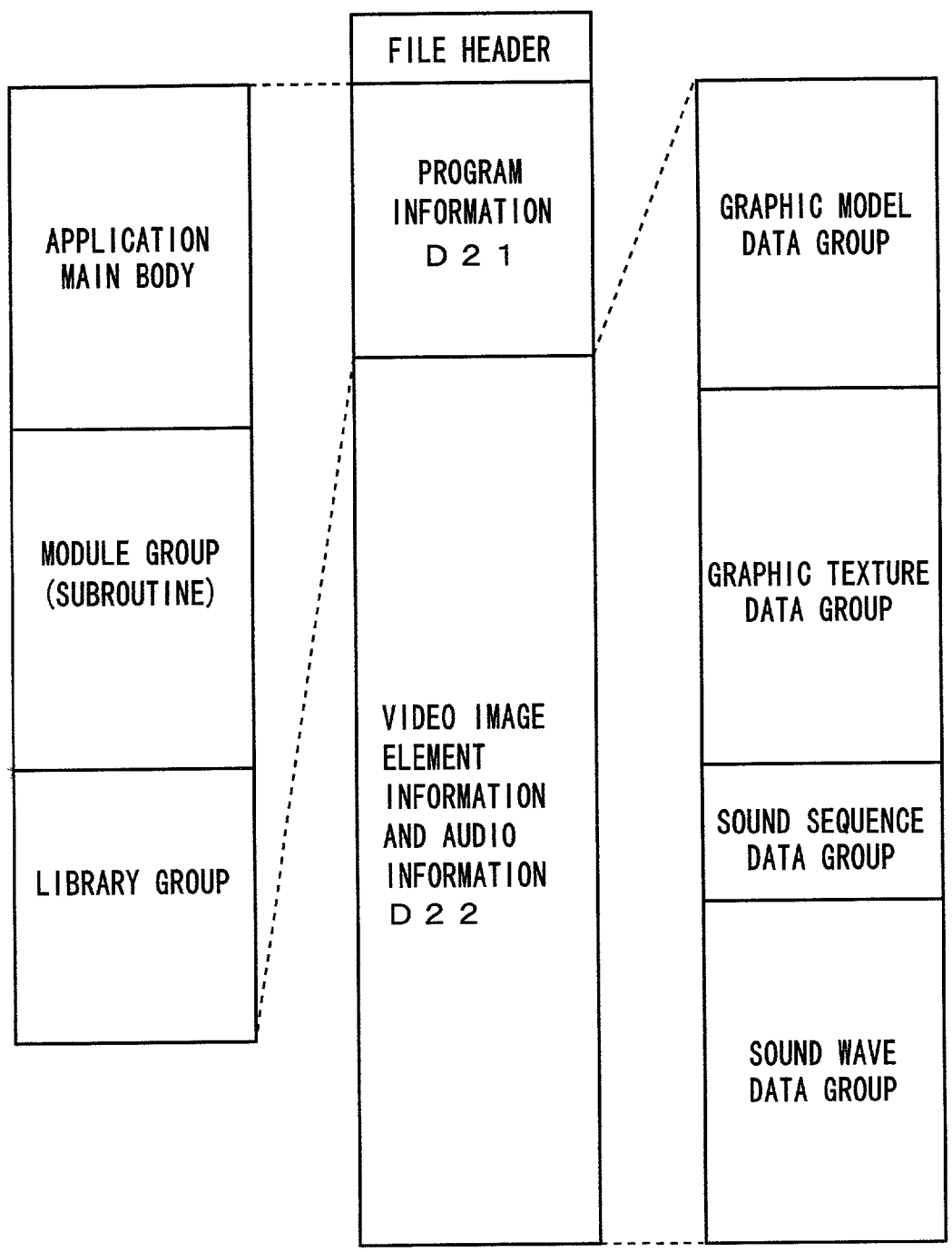
FIG. 7 is an imaginary view showing an example of contents of the program information, video image element information, and audio information.

Following this block header, M+1 packets are described in each block. Packet 0 is a start packet, and packet M is a last packet. Packet codes, attributes such as the start middle, and end of the packet, error correction codes such as parity are described at the packet 1, for example of the packets 0 to M. FIG. 7 shows exemplary contents of the program information D21 and video image element information D22 described in this packet.

A file header, program information D21, video image element and audio information D22 are described at a packet shown in FIG. 7. Following the file header, application main body containing a polygon drawing command; and program information D21 consisting of a module group such as subroutine of this application and a library group are described.

In this application, program data is described such that the user can select whether to set a program reproduction mode, for example, or to set an interactive advertisement operation mode. In addition, a control program is also described such that in the case where a priority is set to an advertisement video image, when such advertisement video image is displayed, the user can select arbitrary advertisement information D2 from the advertisement information D2 concerning a plurality of advertisements.

Following this program information D21, video image element and audio information D22 are described. For example, there is described a graphic model data group containing moving image data such that a spot advertisement according to the entire appearance of a vehicle, for example, is displayed as a two-dimensional or three-dimensional video image. The moving image data is compressed by DCT (distance cosine transformation). With respect to moving image data, apart from the entire appearance of a vehicle, there is described two-dimensional or three-dimensional video image element data of vehicle sheets, opening and closing doors, the inside of the trunk, or engine room or the like concerning a least significant hierarchy of its display contents.

Following a graphic model data group, a graphic texture data group is described. Furthermore, texture data is provided to configure 1-polygon shape data in 76 bytes. 1 polygon is expressed by a triangle having three vertexes, and texture ID is described at the beginning of shape data. Then, each of the X, Y and Z coordinates of a first vertex of the triangle is described, and the color value of the first vertex and texture U and V coordinates are described. Subsequently, each of the X, Y and Z coordinates of a second vertex is described, and the color value and texture U and V coordinates of a second vertex are described. Further, each of the X, Y and Z coordinates of a third vertex is described, and the color value and the texture U, V coordinate of a third vertex is described.

These items of texture data are serially provided so as to connect the vertexes of a triangular shape to each other according to a user operation. Then, coordinate conversion is made for each vertex, raster processing is performed for each polygon, and the color texture address (U, V) of each pixel is computed. Then, the texture color of the U and V coordinates of each pixel is computed by performing raster processing for each polygon. Then, the texture color of the U and V coordinates are read out from texture data specified by texture ID, the color value of each pixel is determined, and a three-dimensional advertisement image is displayed on a monitor based on this color value.

In addition, a sound sequence data group is described as video image element information, and a sound wave data group is described as audio information. Sound wave data is processed according to a user operation and sound sequence, and is provided so as to generate door opening and closing sound, trunk opening and closing sound, and engine rotation sound or the like. These groups of data are provided so as to be distributed from the information distribution device 19 to the entertainment device 101 or the like within a predetermined period of time.

Figure 8:
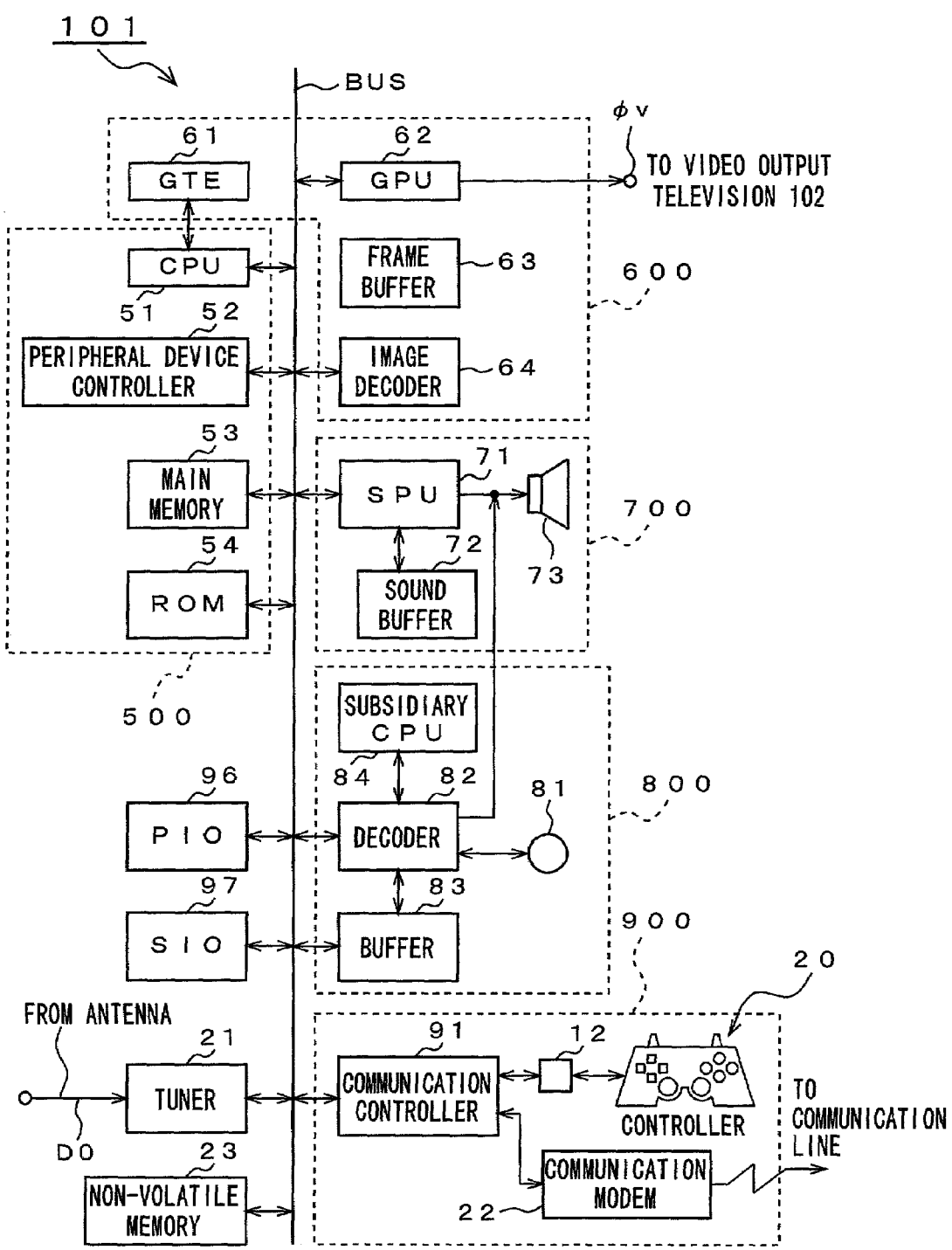
FIG. 8 is a block diagram depicting an exemplary internal configuration of an entertainment device 101.

Now, an exemplary internal configuration of an entertainment device 101 applied in an interactive advertisement system 100 will be described here. FIG. 8 is a block diagram depicting an exemplary internal configuration of the entertainment device 10.

In this example, a user can select a game mode for executing a game based of data from an optical disk device; the above mentioned program reproduction mode; or interactive advertisement operating mode. Namely, the entertainment device 101 comprises: a control system 500 consisting of a tuner 21 for receiving a group of data (D1+D2) from an information distribution apparatus 19 within a predetermined period of time; a non-volatile memory (storage device) 23 for storing a group of data received by this tuner 21; a central processing unit (CPU) 51 that is a computing unit for reading out the program information D21 from the memory 23 to arbitrary video imaging and processing video image element and audio information D22 based on the program information D21, or reproducing a program based on broadcast information contents D1 and its peripheral units or the like; a graphics system 600 consisting of a graphic processing unit (GPU) 62 or the like for drawing an image in a frame buffer 63; a sound system 700 consisting of a sound processing unit (SPU) 71 or the like for generating music sound, effect sound or the like; an optical disk controller 800 for controlling the optical disk in which application program is recorded operated to control at least a control system 500; an external controller 20 that is an operating unit controlling at least control system 500; a communication control system 900 for controlling an input/output of data from the external controller 20 and a memory card for storing settings of signals and games from an external controller 20 to which a user's command is input; a communication modem 22 connected to a telephone line or Internet; and bus to which each of these units is connected or the like.

This control system 500 comprises a CPU 51; a peripheral unit controller 52 for performing interrupt control or direct memory access (DMA) transfer control or the like; a main memory (main memory device) 53 consisting of a random access memory (RAM); and a read only memory (ROM) storing programs such as so called operating system managing the main memory 53, graphic system 600, and sound system 700 or the like. The main memory 53 used here can execute a program on that memory. When in an interactive advertisement operation mode, program information D21 stored in a memory 23 is used.

A CPU 51 controls the entirety of this entertainment device 101 by executing an operating system stored in a ROM 54, and consists of a 32 bits RISC-CPU, for example. When such interactive advertisement operating mode is executed, video image element and audio information D22 are video imaged and processed based on program information D21 read out from the memory 23. A flash memory such as EEPROM is used for a non-volatile memory 23. When a RAM is used, a backup power source or the like is used to provide non-volatile properties.

When this entertainment device 101 is powered ON, the CPU 51 of the control system 500 executes an operating system stored in the ROM 54 or memory 23 according to the game mode, program reproduction mode or interactive advertisement operating mode. In this manner, the CPU 51 controls a graphic system 600 or sound system 700 and the like.

In addition, when an operating system is executed, the CPU 51 initializes the entirety of the entertainment device 101 such as operational checks. Then, the CPU 51 controls this optical disk controller 800. When in a game mode, the CPU executes an application program such as game recorded in an optical disk. In this example, when in an interactive advertisement operating mode, operation substantially identical to game mode can be performed based on the program information D21 and video image element and audio information D22 read out from the memory 23.

Therefore, by executing a program such as game mode or interactive advertisement operating mode, the CPU 51 controls this graphic system 600 or sound system 700 and the like according to the user input so as to control image display or generation of an effect or music sound and the like.

In addition, this graphic system 600 displays and controls at least advertisement video image or program video image operated by the external controller 20. The graphic system comprises: a geometry transfer engine (GTE) 61 that processes coordinate conversion or the like that configures a computing uniti; a GPU 62 that draws an image in accordance with an image drawing command from the CPU 51; a frame buffer 63 for storing an image drawn by this GPU 62; and an image decoder 64 for decoding image data compressed and encoded by orthogonal conversion such as discrete cosine conversion. A television 102 is connected to the GPU 62, and video output signals φ v such as the game video image, data broadcasting program video image and interactive advertisement video image are supplied to the GPU 62.

This GTE 61 comprises a parallel computation mechanism that executes a plurality of computations in parallel, for example so that computations such as coordinate conversion, light source calculation, matrix or vectors can be performed speedily according to a computation request from this CPU 51. Specifically, in the case of computation for performing flat shading for image drawing a polygon of one triangular shape in the same color, for example, this GTE 61 can perform coordinate computation for a maximum of about 1,500,000 polygons per second, whereby this entertainment device 101 can reduce a burden of the CPU 51, and perform high speed coordinate computation.

In addition, this GPU 62 draws an image such as polygon relevant to a frame buffer 63 in accordance with a image drawing command from the CPU 51. This GPU 62 can perform image drawing for a maximum of about 360,000 polygons per second. Further, this frame buffer 63 consists of a so called dual port RAM. The buffer can perform transferring of image drawing from the GPU 62, or from the main memory 53 or the memory 23, and readout for display, simultaneously.

This frame buffer 63 has a capacity, for example, of 1 M byte, and is handled as a matrix that consists of 1024 pixels horizontally and 512 pixels vertically, respectively, in 16 bits. In addition, in this frame buffer 63, apart from a display region output as a video output, there are provided a CLUT region for storing a color lookup table (CLUT) to be referred to when the GPU 62 draws an image such as polygon; and a texture region for storing an element (texture) to be inserted (mapped) in a polygon or the like coordinate converted during image drawing and image drawn by the GPU 62. These CLUT region and texture region are dynamically changed in accordance with display region change or the like.

This GPU 62 can perform: grow shading for causing interpolation from a color of a polygon vertex, thereby determining the color in the polygon, apart from the above mentioned flat shading; and texture mapping for mapping a texture stored in this texture region to the polygon. In the case where these grow shading or texture mapping is performed, this GTE 61 can perform coordinate computation for a maximum of about 500,000 polygons per second.

Further, an image decoder 64, under control of this CPU 51, provided to decode and store in the main memory 53 is image data which is on still image or moving image concerning game, data broadcasting program or advertisement and stored in a main memory 53 or memory 23. The audio and video image information D1 reproducing a data broadcasting program or image data reproduced by an optical disk device is stored in a frame buffer 63 via the GPU 62, whereby these information or data can be used as a background of an image drawn by the above mentioned GPU 62.

A sound system 700 comprises: an SPU 71 for generating a music or effect sound based on a command from the CPU 51; a sound buffer 72 for recording waveform data or the like or recording sound data concerning interactive advertisements stored in the memory 23; and a speaker 73 for outputting a music or effect sound generated by the SPU 71.

The SPU 71 comprises an ADPCM decoding function for reproducing audio data generated by adaptively predicting and encoding (ADPCM: Adaptive Differential PCM) a 16-bit audio data as a 4-bit differential signal; a reproduction function for reproducing waveform data stored in the sound buffer 72, thereby generating an effect sound or the like; and a modulation function or the like for modulating and reproducing waveform data stored in the sound buffer 72.

By providing such function this sound system 700 can be used as a so called sampling sound source for generating a music or effect sound or the like based on waveform data recorded in a sound buffer 72 by a command from the CPU 51. This optical disk controller 800 comprises: an optical disk device 81 for reproducing programs or data and the like recorded in an optical disk; a decoder 82 for decoding programs or data and the like recorded with error correction codes (ECC) added thereto; and a buffer 83 for speedily reading out data from an optical disk by temporarily storing data from the optical disk device 81.

In addition, audio data recorded in an optical disk read out by the optical disk device 81 includes so called PCM data obtained by analog/digital converting an audio signal as well as the above mentioned ADPCM data. As ADPCM data, audio data recorded with a difference in 16-bit digital data being expressed in 4 bits is decoded by means of a decoder 82. The decoded data is supplied to the above mentioned SPU 71. Then, the supplied data is subjected to processing such as digital/analog conversion in the SPU 71, and then, is used to drive the speaker 73. In addition, as PCM data, for example, audio data recorded as 16-bit digital data is decoded by means of the decoder 82, and then, is used to drive the speaker 73.

Further, a communication control system 900 comprises: a communication controller 91 that controls communication with the CPU 51 via a bus; and a communication modem 22 for receiving also advertisement information D2 or the like concerning an interactive advertisement. A controller connection terminal 12 is connected to the communication controller 91, and an external controller 20 for inputting operation input D3 from the user is connected. A telephone line or Internet is connected to the communication modem 22. In addition, a memory card inserter to which a memory card or a hand held terminal device or the like is connected as an auxiliary storage device for strong game setting data or the like is provided at this communication controller 91 (not shown).

The external controller 20 connected to this controller connection terminal 12 has 16 command keys, for example, to input a command from the user. The states of these command key are distributed to the communication controller 91 about 60 times per second by synchronous communication in accordance with a command from the communication controller 91. Then, the communication controller 91 distributes the state of a command key of the external controller 20 to the CPU 51. In this way, the command from the user is input to a CPU 51. This CPU can perform processing in accordance with a user command based on the interactive advertisement operating mode or game mode and the like being executed.

Here, it is required to transfer a large amount of data at a high speed when a program is read out or an image is displayed or drawn among the memory 23, main memory 53, GPU 62, image decoder 64, and decoder 82 or the like. At this entertainment device 101, as described above, so called DMA transfer for directly transferring data among the main memory 53, GPU 62, image decoder 64 and decoder 82 or the like can be performed under the control of a controller 52 of a peripheral device without intervening the CPU 51. In this manner, a burden of the CPU 51 caused by data transfer can be reduced, and high speed data transfer can be performed. In addition, a parallel I/O interface (PIO) 96 and a serial I/O interface (SIO) 97 are interfaces for connecting an external expansion device and the entertainment device 101 to each other.

Now, an example of processing in an interactive advertisement system 100 will be described here by using the flow chart at the receiver side shown in FIG. 3.

In the present embodiment, assume a case in which data concerning a data broadcasting program or interactive advertisement are distributed from the broadcast station 9 to the entertainment device 101 by using an existing terrestrial wave broadcasting infrastructure. Such case is exemplified that at the transmission side, broadcast information contents D1 concerning a data broadcasting program, and for example, advertisement information D2 concerning vehicle sales are provided, and these data are transmitted to be multiplexed by using a vertical blanking period of a TV broadcast signal. Assume a case in which game mode is determined in advance not to be selected With these cases being assumed, at the receiver side, when a predetermined time comes, a transfer request command is automatically received. After the setup period, at the step B1 in the flow chart shown in FIG. 3, the broadcast information contents D1 concerning a data broadcasting program and a group of data consisting of advertisement information D2 concerning vehicle sales are received by means of a tuner 21 through an antenna 42, a coaxial terminal 44, and a coaxial cable 40. These data are decoded by means of a decoder circuit (not shown) incorporated in the tuner 21, and then, is writing controlled by means of the CPU 51 to be stored in a non-volatile memory 23 or a main memory 53 with a backup function.

When all the data are received, it reverts to a standby state. Then, the standby state is released, for example, and processing goes to the step B2'. At this step, if a game mode is set to be deselected, a spot advertisement according to the appearance of the entire vehicle is always displayed as a two-dimensional or three-dimensional image with respect to an interactive advertisement at the beginning of a data broadcasting program. Then, processing goes to the step B3' at which a application is executed such that the user can select whether or to set a program broadcast mode or to set an interactive advertisement operating mode.

Here, in the case where the program reproduction mode is selected, processing goes to the step B4' at which broadcast information contents (audio and video image information) D1 according to a data broadcasting program are read out from the memory 23 to a control system 500. Then, processing goes to the step B51 at which a graphic system 600, a sound system 700 or the like is controlled by means of a control system 500, whereby the broadcast information contents D1 are reproduced.

In addition, in the case where the interactive advertisement operating mode is selected at the step B3', processing goes to the step B6' at which program information D21 and video image element and audio information D22 according to an interactive advertisement of a vehicle are read out from the memory 23 to the controller 500. Then, processing goes to the step B7' at which the graphic system 600, sound system 700 and the like are controlled by means of the control system 500 based on operation input D4 from the external controller 20 that the user operates freely and the program information D21 read out from the memory 23, whereby the video image element and audio information D22 are subject to video image processing such that a three-dimensional and high resolution video image when a vehicle is seen at a variety of angles is displayed.

In this example, the video image element and audio information D22 are video imaged and processed by means of the CPU 51, whereby a three-dimensional image of vehicle sheets, door opening and closing, the inside of the trunk, and the inside of engine room or the like can be operated with respect to the least significant hierarchy of the display contents of the spot advertisement of a vehicle like playing a game. At the step B8', an interactive advertisement or data broadcasting program is provided so as to be displayed on a television 102 or the like. At the step B9', it is judged whether or not the game mode, program reproduction mode, or interactive advertisement operating mode and the like is ended. This judgment is made by the user.

In the case where these modes are ended, power is turned OFF, for example. In the case where these modes are not ended, processing reverts to the step B2' at which a spot advertisement concerning an interactive advertisement is displayed based on video image element and audio information D22 before displaying a data broadcasting program. When the data broadcasting program is ended, a spot advertisement may be displayed based on the video image element and audio information D22.

In this manner, in the interactive advertisement system 100 that is a first embodiment according to the present invention, an interactive advertisement or reproduced data broadcasting program consisting of a three-dimensional video image of vehicle sheet, door opening or closing, the inside of the trunk, or the inside of engine room, which are video imaged and processed by the control system 500, graphic system 600 and sound system 700 asynchronously relevant to a terrestrial broadcast is displayed on the television 102 or the like, whereby the user can see or hear it freely at any time he or she likes or can play it like playing a game.

In this way, a concept of big four mass media advertisement, the advertisement having been supplied one-sidedly, is reversed, and a new generation electronic advertisement medium for interactively performing advertisement can be constructed. Moreover, the user can operate an interactive advertisement enjoyably by using an external controller 20 like playing a game as compared with a conventional type of advertisement that has only been seen or heard. Thus, in the future, an interactive advertisement can be expected to naturally spread in an increased number of users who likes to play a game.

The user's interest is increased unconsciously, and thus, an advertise 99 can carry out an advertisement with its high advertisement effect. This greatly contributes to the introduction into a demand for new interactive advertisement industry. In this manner, new game media following arcade game, home use game machine, hand held game machine or the like can be created. That is, a new media fusing the entertainment device 101 and advertisement can be created.

(3) Second Embodiment

Figure 9:
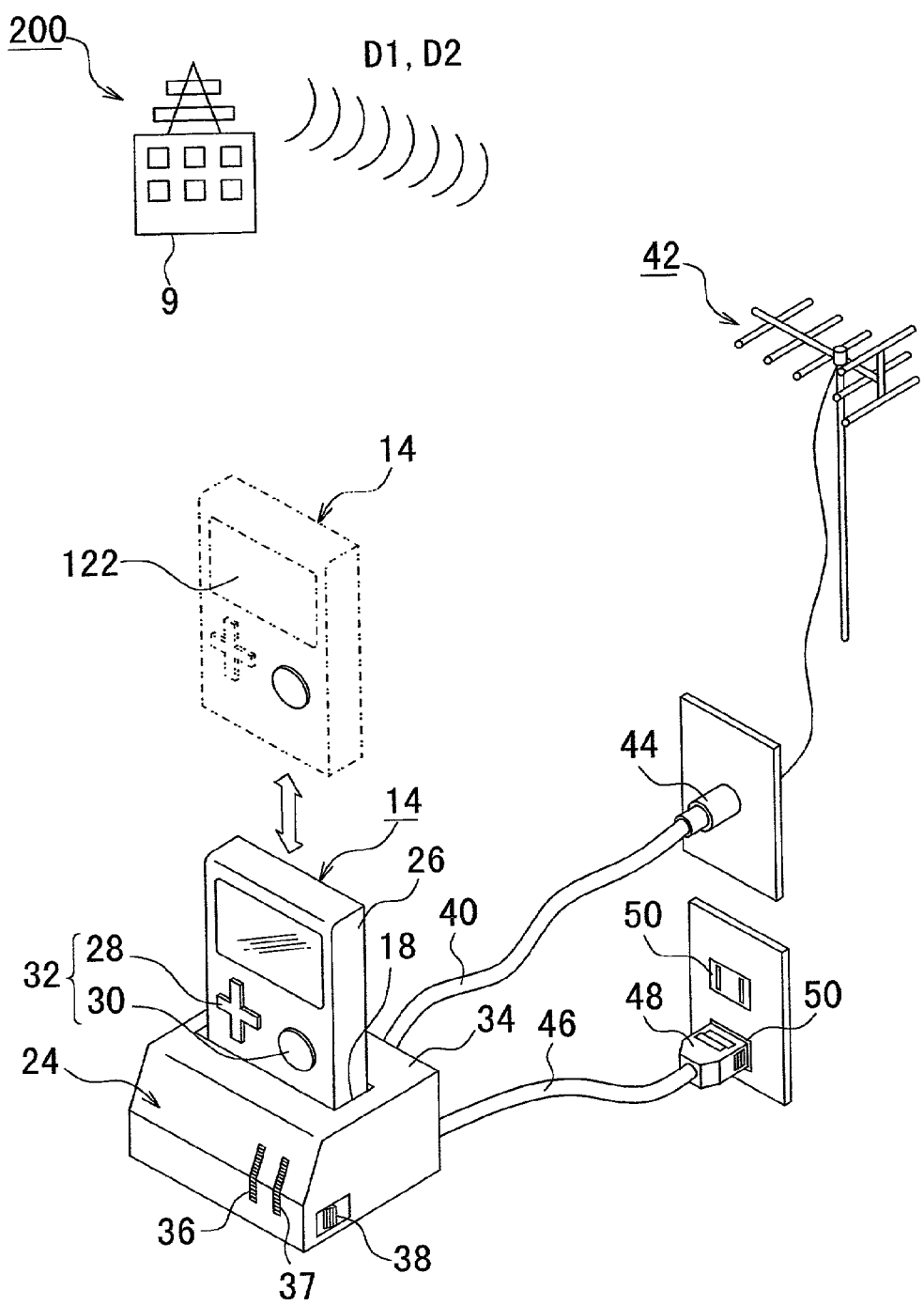
FIG. 9 is an imaginary view showing an exemplary configuration of an interactive advertisement system 200 according to a second embodiment of the present invention.

FIG. 9 is an imaginary view showing an exemplary configuration of an interactive advertisement system 200 that is a second embodiment according to the present invention, In this system 200, a system for seeing and hearing an interactive advertisement is configured by a hand held terminal device 14 shown in FIG. 9, instead of the television 102 applied in the first embodiment. As an information processing apparatus, a tuner device 24 with a power charge function and a hand held terminal device 14 mountable to this tuner device 24 are provided, and a non-volatile storage device for storing data is provided in the tuner device 24.

This tuner device 24 is similar to that in the first embodiment in that the advertisement information D2 according to a data broadcasting program and an interactive advertisement is received and stored. Instead of outputting this information to the television 102, and operating an interactive advertisement by means of the external controller 20, the broadcast information contents D1 concerning a data broadcasting program stored in the tuner device 24 and the advertisement information D2 concerning an interactive advertisement are downloaded on the hand held terminal device 14, so that the user operates the video image or audio concerning an interactive advertisement by using a liquid crystal display monitor 122 and an operation key 32 of the hand held terminal device 14.

A general-purpose serial interface (wired or wireless) such as USB or IEEE 1394 and IrDA is used for downloading from this tuner device 24 to the hand held terminal device 14. In addition, a dedicated interface or the like for directly connecting a wired device, a wireless device, or a connector may be provided at the tuner device 24. The data received by the tuner device 24 may be directly stored in a non-volatile memory or hard disk unit in the hand held terminal device 14 without being stored in the tuner device.

The tuner device 24 with the power charge function shown in FIG. 9 has a tuner (not shown) so as to receive a group of data such as the broadcast information contents D1 or advertisement information D2 or the like distributed from the broadcast station 9. The hand held terminal device 14 can be connected to the tuner device 24, and a group of data downloaded from the tuner device 24 are image processed.

This hand held terminal device 14 comprises an operation key 32 and a liquid crystal display monitor 122 that is a display unit. The interactive advertisement video image or data broadcasting program operated by this operation key 32 are displayed on the liquid crystal display monitor 122.

This liquid crystal display monitor 122 has, for example, a color liquid crystal screen with 320 pixels×240 pixels. At its lower end side, this hand held terminal device 14 is inserted into a recess 18 of the tuner device 24, whereby a secondary battery incorporated in this hand held terminal 14 is charged.

At a casing 26 of the hand held terminal device 14, apart from the above mentioned liquid crystal display monitor 122, there are provided a cross key 28 and an OK key 30 configuring the operation key 32. Although the cross key 28 and OK key 30 are operated to control a computing unit described later, the OK key functions as a power switch of the hand held terminal device 14.

On the other hand, at a casing 34 of the tuner device 24 with a power charge function, apart from the above recess 18, there are provided a power charge display lamp 36 indicating a charge state such as the progress or end of power charge; a reception indicating lamp 37 indicating that the hand held terminal device 14 is receiving data; a channel selection switch 38 for selecting a desired broadcast channel in a data broadcast. The advertisement specific program channel can be seen and heard when the channel selection switch 38 is set to channel 100, for example. Of course, in this case, the channel 100 is used as an advertisement specific channel at the broadcast station 9.

Further, a coaxial cable 40 is connected to this tuner device 24 with a power charge function to reach a coaxial terminal 44. An aerial wire antenna 42 is connected to this coaxial terminal 44, so that advertisement information D2 concerning a data broadcasting program and an interactive advertisement as well as TV program broadcast caused by a general terrestrial wave are received. In addition, an AC plug (alternating current plug) 48 to which power code 46 is connected is provided at the tuner device 24. The AC plug is connected to a power receptacle 50, and a commercially available power (simply referred to as AC power supply) is supplied.

Figure 10:
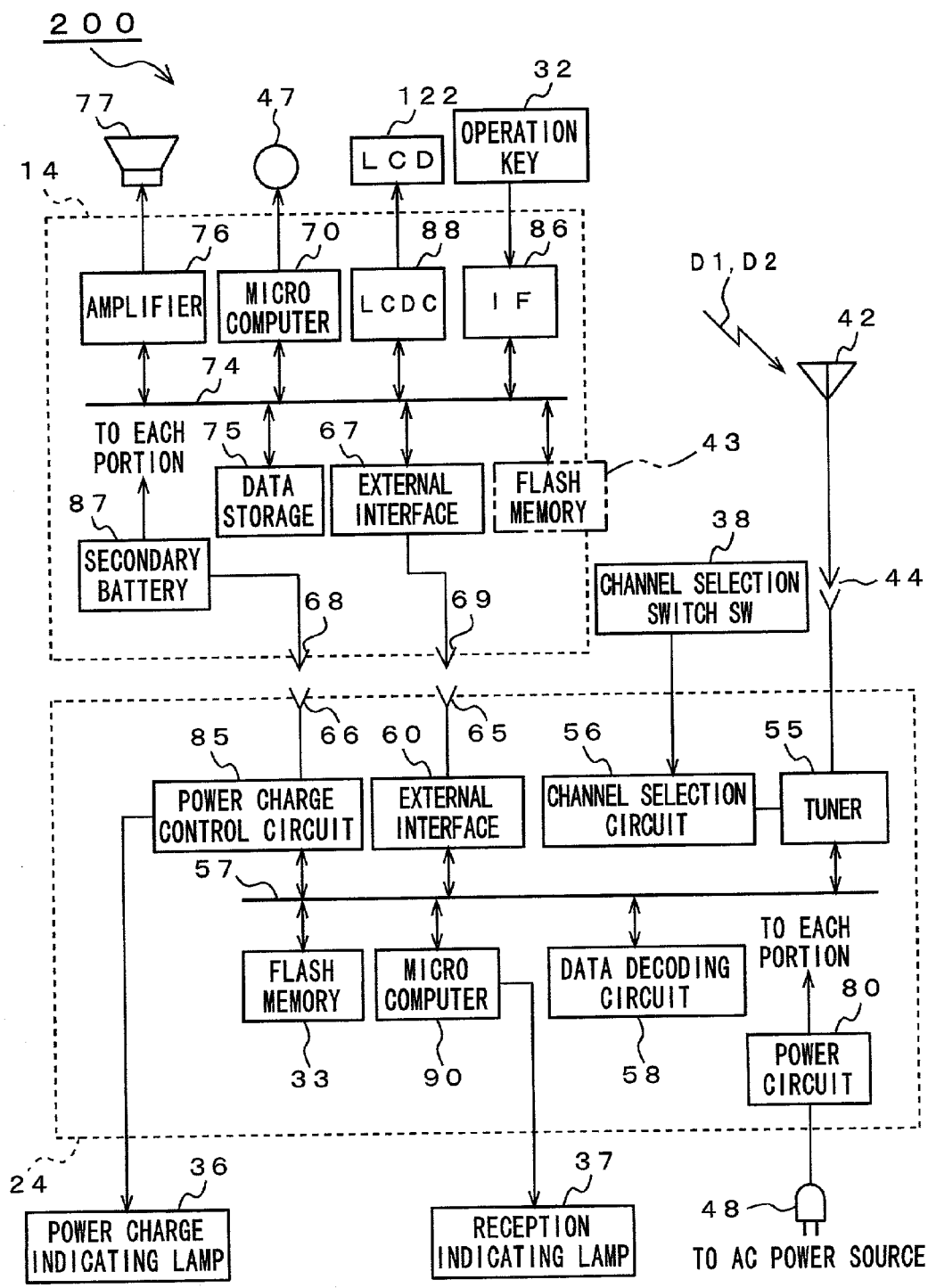
FIG. 10 is a block diagram depicting an exemplary internal configuration of a tuner device 24 and a hand held terminal device 14.

FIG. 10 is a block diagram depicting an exemplary internal configuration of the tuner device 24 and hand held terminal device 14. In FIG. 10, the tuner device 24 with its power charge function has a tuner 55 for receiving externally supplied data. This tuner 55 extracts data such as broadcast information contents D1 according to a data broadcasting program or advertisement information D2 according to an interactive advertisement from the terrestrial wave broadcast signal received by the antenna 42, and sends them to a bus 57.

In the present embodiment, the broadcast information contents D1 according to a data broadcasting program or advertisement information D2 according to an interactive advertisement are multiplexed, for example, by using a vertical blanking interleaving interval (VBI) that is an interval of electronic broadcast waves using an NTCS system that is a terrestrial wave television broadcast. A variety of digital contents can be distributed (the contents used here include a variety of information such as video images, images (moving and still pictures), audio, characters, numerals; a program or CM reproduced by a television receiver or radio receiver; and the contents of journals or newspaper). Therefore, the television broadcast waves of this terrestrial waves can be received by means of the antenna 42 such as conventional Yagi antenna.

Television broadcast waves include a plurality of channel waves. In order to select and receive a desired channel, the selection frequency of a tuner 55 can be switched through a channel selection circuit 56 based on the channel information set by the channel selection switch 38 (also refer to FIG. 9).

The data (here, referred to as NTSC signal) selected by this tuner 55 and supplied to a bus 57 is decoded by means of a data decoding circuit 58. When a data according to the above various contents multiplexed as a VBI is present in such NTSC signal, the decoded data such as broadcast information contents D1, program information D21, and video image element and audio information D22 is temporarily stored in a flash memory 33, including a case in which a hand held terminal device 14 is not set under the control of a microcomputer 90 that functions as a reception controller or the like.

When the hand held terminal device 14 is set, data may be directly transferred simultaneously to the hand held terminal device 14 through an external interface 60 that is a serial interface or a connection terminal 65. In this case, the data decoding circuit 58 and microcomputer 90 may be configured in an integrated system LSI. The data sent to the hand held terminal device 14 through the connection terminal 65 is electrically written in a data storage 75 or flash memory 43 that is an example of a non-volatile storage device under the control of a microcomputer 70 through a connection terminal 69 of this hand held terminal device 14, an external interface 67 and a bus 74 that are serial interfaces.

A read only memory (EEPROM) or the like in which information can be written and erased is used for this storage device. In this example, even if the hand held terminal device 14 is not set to a tuner device 24, data such as broadcast information contents D1 or advertisement information D2 are electrically stored in the flash memory 33. When the hand held terminal device 14 is set to the tuner device 24, data are transferred to a data storage (storage device) 75 of the hand held terminal device 14 under the control of a microcomputer 90.

The storage capacity of flash memories 33 and 43 or data storage 75 may be 16 [MB] in the case where a data rate of a data broadcast is about 40 [kbps] and an attempt is made to store the data at least for about 50 minutes. 40 [kbps]/8 [bits]×50 [minutes]×60 [seconds]=15 [MB].

The micro computer 70 is a digital computer that is provided as an example of a computing unit. This computer arbitrarily video images and processes the video image element and audio information D22 based on the program information D21 read out from the data storage 75 or reproduces a complete packet program based on the broadcast information contents D1.

The microcomputers 70 and 90 each have: CPU (central processing device); a ROM (including EEPROM) that is a memory; a RAM (random access memory): an input/output interface, a clock that is a clock device; and a time that is a timer device or the like, and functions as a controller, a computing unit, a processing unit or the like. Therefore, as described above, the function of the data decoding circuit 58 can be executed by means of the microcomputer 90.

A reception indicating lamp 37 is connected to the microcomputer 90 at the side of the tuner device 24. This reception indicating lamp 37 is controlled to turn ON while data is transferred from the tuner device 24 to the data storage 75 and while data is stored in the data storage 75 and to turn OFF in the other cases. The reception indicating lamp 37 may blink when data reception has been completed.

The tuner device 24 further has a power circuit 80. This power circuit 80 converts an alternating current voltage such as 100 ACV supplied from an external AC power source to direct current voltage, and supplies the voltage to all the blocks in the tuner device 24. In this case, a power charge control circuit 85 converts the direct current voltage supplied from the power circuit 80 into a power charge direct current, for example, supplies the current to a secondary battery 87 of the hand held terminal device 14 via a connection terminal 68 of the hand held terminal device 14 through the connection terminal 66, and controls power charge. The power charge control included in the power charge control circuit 85 controls a charge current while detecting a temperature of a secondary battery 87, and performs remaining capacity detection and control and battery full charge detection and control of the secondary battery 87. As the secondary battery 87, a lithium ion battery or nickel hydrogen battery and the like can be used.

A charge indicating lamp 36 is connected to the charge control circuit 85. This charge indicating lamp 36 is controlled to turn ON while the power of the secondary battery 87 is charged and to turn OFF when the battery is full. Further, the operation key 32 is connected to the hand held terminal device 14 via a bus 74 and an interface 86, and a liquid crystal display monitor 122 is connected thereto via a liquid crystal display controller (LCDC) 88. An audio processing unit 76 is connected to the above mentioned bus 74, and audio amplification processing or the like is performed. A speaker 77 is connected to an audio processing unit 76 so as to output audio information concerning a data broadcasting program or interactive advertisement.

Now, an example of processing in an interactive advertisement system 200 will be described here. FIG. 11 is a flow chart showing an exemplary operation of a hand held terminal device 14 in the system 200.

In this example as well, data are configured by broadcast information contents D1 concerning a data broadcasting program (contents) and advertisement information D2 concerning an interactive advertisement so that the data are distributed from the broadcast station 9 to the user. The program used here includes moving pictures or comics such as photographs or animation; still picture such as electronic program table; and software (data) such as game, music, character information. An advertisement is organized so as to appear between these programs in a spot manner, and produced by software programs including image or audio data.

In this example, the hand held terminal device 14 is set to the tuner device 24. In a data download wait state, the tuner device 24 enters a standby mode. The standby mode used here denotes a state in which a system LSI such as microcomputer 70 or LCDC 88 of the hand held terminal device 14 is turned OFF excluding the interface function with respect to the microcomputer 90 of the tuner device 24 and clock function.

In this interface function as well, unlike general data transfer, a startup command from the microcomputer 90 can be polled at a required minimum low rate. The tuner device 24 is supplied with power from a power circuit 80 to each unit to detect transfer request command. In addition, the hand held terminal device 14 is set to the tuner device 24, and thus, a secondary battery 87 is charged by means of the power charge control circuit 85 during this setting.

With this being presumed, in the tuner device 24, a transfer request command distributed from the broadcast station 9 is detected during a standby mode at the step C1 in the flow chart shown in FIG. 11. In the case where the transfer request command is detected by the tuner device 24, the transfer request command for notifying the start of downloading is transferred from the tuner device 24 to the hand held terminal device 14. Thus, at the hand held terminal device 14, using a setup period, the microcomputer 70 itself starts up the hand held terminal device 14 in a receiving mode at the step C2.

The receiving mode used here denotes an intermediate mode between a standby mode and a normal (general use) mode. The microcomputer 70 enters a state in which, in addition to the standby function, a high speed interface function with the tuner device 24 and an external memory interface function for transferring the acquired data to the data storage 75 such as flash memory are further turned ON. Therefore, at this time, power is supplied from the secondary battery 87 to the data storage 75 and microcomputer 70 and the like.

Then, processing goes to the step C3 at which the reception indicating lamp 37 indicating that data are being received is turned ON by means of the microcomputer 90 of the tuner device 24. The power charge indicating lamp 36 is turned ON because the hand held terminal device 14 is set to the tuner device 24. The hand held terminal device 14 waits for a program start command from the tuner device 24.

At the step C4, whether a program start command is described with respect to a data following a setup period is detected by means of the microcomputer 90. This program start command is a signal that notifies that transfer of all the programs downloaded one time is started. The data on all the programs is divided into a plurality of blocks as described in FIG. 6 and FIG. 7. Therefore, when block start command is received (detected), processing goes to the step C5 at which whether or not a block header is described in packets of the first (start) block is detected.

In the case where this block header is detected, processing goes to the step C6 at which packet-like data groups finely divided in blocks are placed in the microcomputers 70 and 90, and packet transfer processing is executed while a handshake is taken. During this transfer processing, there is a case in which an external flash memory 43 as well as data storage 75 is applied. Thus, this transfer processing also contains processing for transferring data to this flash memory 43 at any time. Namely, in the tuner device 24, when a data is received, the data is conveniently decoded to binary data by means of the data decoding circuit 58.

As a decoded data file, the broadcast information contents D1 concerning a data broadcasting program and the advertisement information D2 concerning an interactive advertisement are transferred to be temporarily stored in the flash memory 33 or the like. In this example, the decoded data file is transferred simultaneously to the flash memory 33 and the storage 75 of the hand held terminal 14. Thus, even in the case where the user fails to set the hand held terminal device 14 to the tuner device 24, the data file can be re-transferred from the tuner device 24 to the hand held terminal device 14 after the file has been received.

At the end of this packet, an end flag indicating the end of the block is described. Thus, when the microcomputer 70 recognizes this fact, processing goes to the step C7 at which whether or not a program end command following the packet end flag is described is detected. In the case where the program end flag is not detected, processing goes back to the step C5 at which whether or not the next block header is described is continuously detected.

In this way, data files are transferred one after another from the tuner device 24 to the data storage 75 or an external flash memory 43 depending on the model of the hand held terminal device 14 until the program end command has been detected. When all the data are temporarily recorded in the flash memory 33 or data storage 75, external flash memory 43 and the like according to a buffer memory in the microcomputer 70, processing goes to the step C8 at which the reception indicating lamp 37 of the tuner device 24 is turned OFF by means of the microcomputer 90. A "receiving" indicator 47 of the hand held terminal device 14 is turned OFF by means of the microcomputer 70 that has received the program end command.

Then, processing goes to the step C9 at which a "received" lamps blink at the tuner device 24 and the hand held terminal device 14. The "received" lamp may be compatible with the reception indicating lamp 37 or the "receiving" indicator 47. Processing goes to the step C10 at which the hand held terminal device 14 enters a standby mode.

Now, an exemplary operation of a hand held terminal device 14 in an interactive advertisement system 200 will be described here. FIG. 12 is a flow chart showing an exemplary operation (main routine) of the hand held terminal device 14 in the interactive advertisement system 200. This example assumes a case in which the hand held terminal device 14 is removed from the tuner device 24 shown in FIG. 10; and an interactive advertisement itself is seen or heard and operated in any times the user likes by using advertisement information D2 stored in the data storage 75 of this hand in held terminal device 14 or external flash memory 43. Here is exemplified a case in which the contents downloaded from the transmission side include moving pictures or comics such as photographs or animation concerning a data broadcasting program; still pictures such as electronic program table or broadcast information contents D1 such as game, music, character information; and, for example, advertisement information D2 concerning vehicle sale.

With this being presumed, when the user turns ON the power source of the hand held terminal device 14 at the step E1 in the flow chart shown in FIG. 12, a system LSI consisting of the external interface 67, microcomputer 70, interface 86, and LCDC 88 enters a normal mode in which all the circuits are operable from the standby mode. Then at the step E2, a first spot advertisement concerning an interactive advertisement, the entire appearance of a vehicle in this example, is displayed directly.

Then, at the step E3, a menu screen is provided to be displayed on a liquid crystal displaying monitor 122. On this menu screen, some of data broadcast programs such as moving pictures such as photographs or animation; still picture such as comics or electronic program table; or game, music, character information, are displayed. These data broadcasting programs are defined as applications A, B, C, D, . . . . The user is prompted to select any one of these applications A, B, C, D, . . . .

Then, at the step E4, the user is prompted such that the user can select whether to set a program reproduction mode or to set an interactive advertisement operating mode. In the case where a program reproduction mode is selected, processing goes to the step E5 at which the broadcast information contents D1 concerning the previously selected application A is read out from the data storage 75 or external flash memory 43. Then, at the step E6, the video image information and audio information according to the application A are reproduced.

In addition, in the case where the interactive advertisement operating mode is selected at the step E4, processing goes to the step E7 at which the program information D21 and the video image element and audio information D22 concerning an interactive advertisement are read out from the data storage 75 or external flash memory 43. Then, at the step E8, a video image according to an interactive advertisement is processed.

Figure 13:
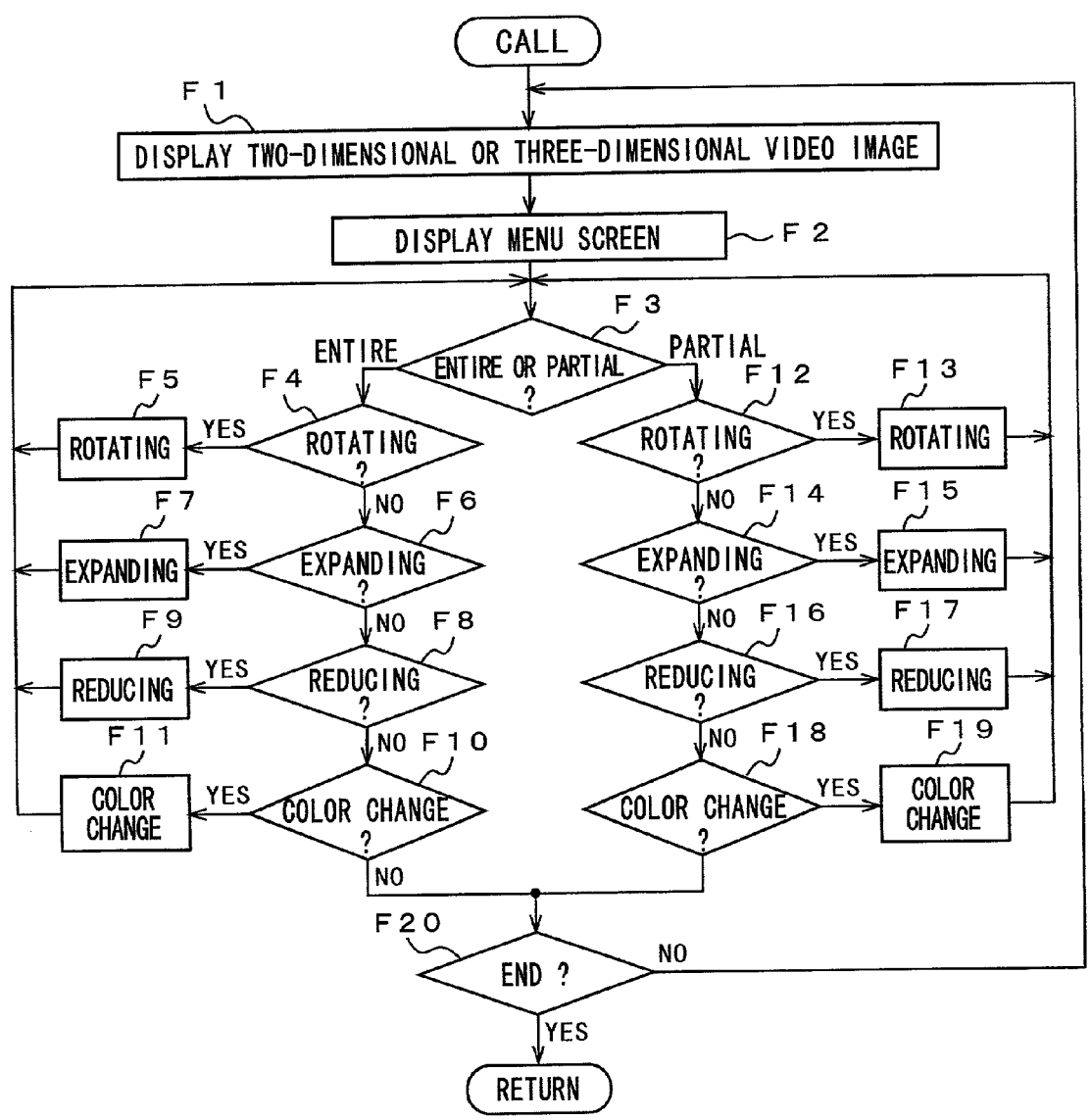
FIG. 13 is a flow chart showing an example of processing (subroutine) according to the advertisement video image processing.

For example, by calling a subroutine shown in FIG. 13, a two-dimensional or three-dimensional video image of a spot advertisement of a vehicle is displayed on a liquid crystal display monitor 122 with respect to an interactive advertisement at the step F1. Then, processing goes to the step F2 at which a menu screen is displayed on the liquid crystal display monitor 122. On this menu screen, the menu concerning how to operate an interactive advertisement or the like is displayed together with operating procedures. Then, the user is prompted such that the user can select whether to set an entire operation mode for video imaging and processing the entire vehicle or to set a partial operation mode for processing a partial video image of the vehicle at the step F3.

In the case where the entire operation mode is selected, for example, processing goes to the step F4 at which it is checked whether or not the entire video image of the vehicle is rotated. In the case where the entire video image is rotated, processing goes to the step F5 at which the rotation processing of that video image is done. In the case where the entire video image of the vehicle is not rotated, processing goes to the step F6 at which it is checked, for example, whether or not the entire video image is expanded. In the case where the entire video image is rotated, processing goes to the step F7 at which expansion processing of vide image information is done. In the case where the entire video image is not expanded, processing goes to the step F8 at which it is checked whether or not the entire video image of the vehicle, for example, is reduced. In the case where the entire video image is reduced, processing goes to the step F7 at which reduction processing of video image information is done.

In the case where the entire video image of the vehicle is not reduced, processing goes to the step F10 at which it is checked whether or not the color of the video image is changed, for example. In the case where the video image of the vehicle is changed in color, processing goes to the step F11 at which the color change processing of the video image is done. At this time, for example, a red colored vehicle is displayed to be changed to a blue colored vehicle. When processing is ended at each of the steps F5, F7, F9 and F11, processing goes back to the step F3 at which the user is prompted such that the user can select whether the entire operation mode is set or the partial operation mode is set.

Therefore, in the case where the partial operation mode is set at the step F3, processing goes to the step F12 at which it is checked whether or not the partial video image of the vehicle, for example, engine room, vehicle sheet, trunk room is rotated. In the case where these partial video images are rotated, processing goes to the step F13 at which the rotation processing of video image information is done.

In the case where the partial video image of the vehicle is not rotated, processing goes to the step F14 at which it is checked whether the partial video image is expanded, for example. In the case where the partial video image is expanded, processing goes to the step F15 at which the expansion processing of video image information is done. In the case where the partial video image is not expanded, processing goes to the step F16 at which it is checked whether or not the partial video image is reduced, for example. In the case where the partial video image is reduced, processing goes to the step F17 at which the reduction processing of the partial video image is done.

In the case where the partial video image of the vehicle is not reduced, processing goes to the step F18 at which it is checked whether or not the partial video image is changed in color. In the case where the partial video image is changed in color, processing goes back to the step F19 at which the color change processing of the partial video image is done. At this time, for example, black and silver colored sheets can be changed to red sheets. When processing is ended at each of the steps F13, F15, F17 and F19, processing goes back to the step F3 at which the user is prompted to select whether to set the entire operation mode or to set the partial operation mode. In addition, in the case where the entire video image or the partial video image is not changed in color at the step F10, F18, processing goes to the step F20 at which it is judged whether or not video image processing concerning an interactive advertisement is ended. This judgment is made by the user.

In the case where this video image processing is not ended, processing goes back to the step F1 at which a program is continued. In the case where this video image processing is ended, it returns to the step E8 of the main routine shown in FIG. 12. Then, a video image is displayed, and an audio is output at the step E9. Then, processing goes to the step E10 at which it is judged whether or not a program reproduction mode or interactive advertisement operation mode and the like is ended. This judgment is made by the user. In the case where the user sees and hears applications A and B, processing goes back to the step E2 at which a spot advertisement concerning an interactive advertisement is displayed again.

In the case where these modes are ended, for example, processing goes to the step E11 at which a liquid crystal display monitor 122 is set to a clock screen, and processing goes to the step E12 at which the power source is turned OFF, thereby entering a standby mode. In the case where these modes are not ended, processing goes back to the step E2 at which a spot advertisement concerning an interactive advertisement is displayed based on video image element and audio information D22 before displaying a data broadcasting program. When the data broadcasting program is ended, a spot advertisement concerning an advertisement based on these items of information D22 may be displayed.

As described above, in the interactive advertisement system 200 according to the second embodiment of the present invention, unlike a conventional advertisement of television or radio broadcast, there is used advertisement information D2 temporarily stored in the data storage 75 of the hand held terminal device 14 or an external flash memory 43. Thus, the interactive advertisement itself can be seed or heard and operated any time the user likes.

In the present embodiment, there has been described a case in which a spot advertisement is displayed immediately after the power switch has been turned ON and before ending applications A, B, C . . . , and going to the menu screen. This advertisement may be inserted as an advertisement providing frame into the applications A, B, C, . . . , without being limited thereto. At this time, the spot advertisements are provided so as to be incorporated individually in each of the applications based on additional definition processing.

(4) Third Embodiment

Figure 14:
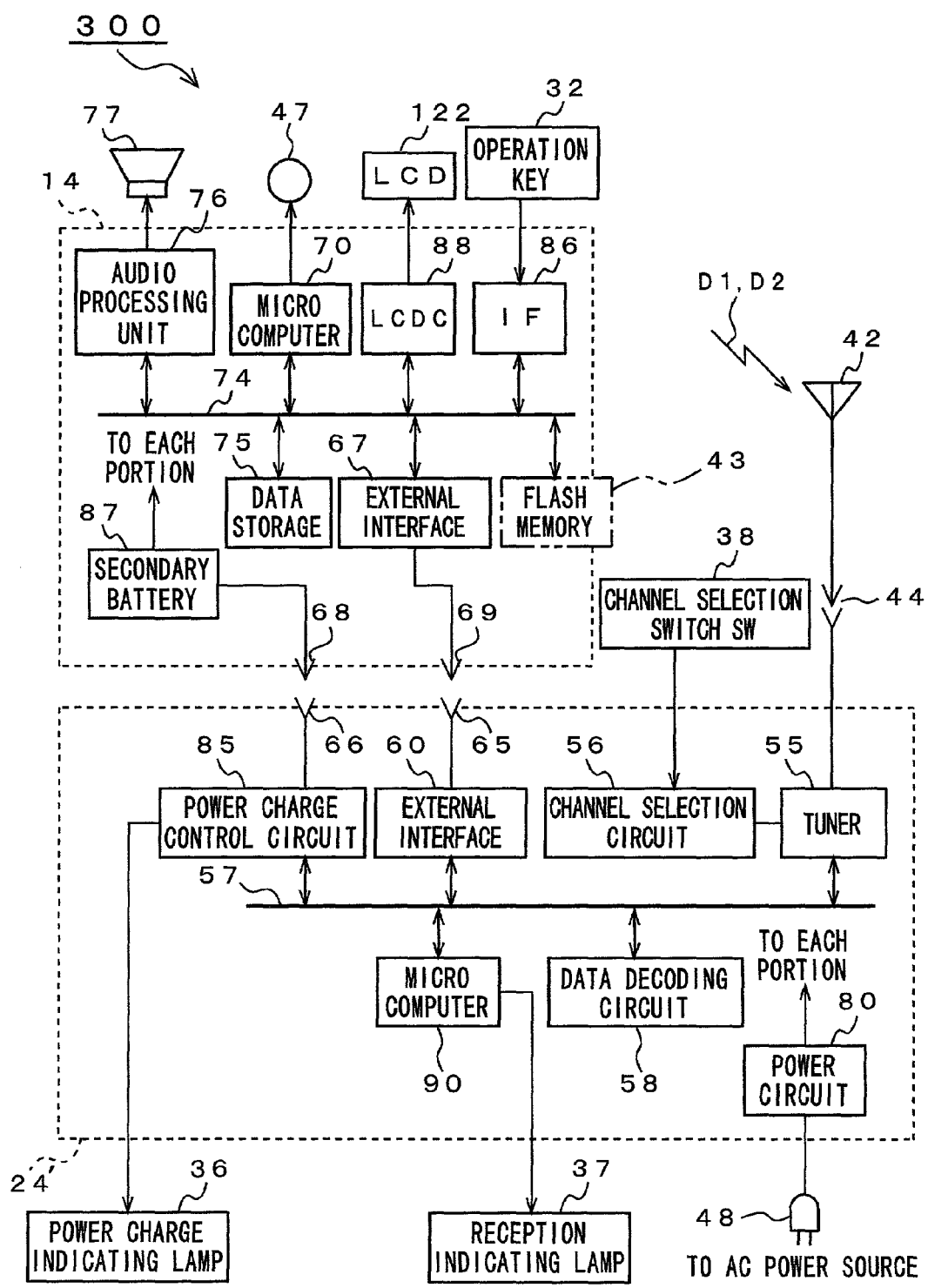
FIG. 14 is a block diagram depicting an exemplary internal configuration of a tuner device 24' and a hand held terminal device 14 used in an interactive advertisement system 300 that is a third embodiment according to the present invention.

FIG. 14 is a block diagram depicting an exemplary internal configuration and connection of a tuner device 24' and a hand held terminal device 14 used in an interactive advertisement system 300 that is a third embodiment according to the present invention. In this example, a data received by the tuner device 24' is directly transferred to and stored in the data storage 75 in the hand held terminal device 14 or a non-volatile storage device such as external flash memory 43. Like elements in the second embodiment are designated by like reference numerals and names, a description of which is omitted here because these functions are similar to each other.

In this interactive advertisement system 300, unlike the second embodiment, a non-volatile storage device is not provided in the tuner device 24'. In the case where a digital program broadcast and an interactive advertisement are received from the broadcast station 9, they are always received in a state in which the hand held terminal device 14 is mounted on the tuner device 24'.

In an operation during reception, at the step C6 in the flow chart shown in FIG. 11, as described in the second embodiment, a data is directly transferred to the hand held terminal device 14, and is subject to writing control of the microcomputer 70 in this hand held terminal device 14. Then, information concerning a data broadcasting program and an interactive advertisement is stored in the data storage 75 or external flash memory 43 and the like. The other operation is identical to that in the second embodiment, a description of which is omitted here.

Therefore, in the third embodiment, unlike the second embodiment, a flash memory 33 can be omitted from the tuner 24', and the tuner device 24' can be reduced in price.

(5) Fourth Embodiment

FIG. 15 is an imaginary view showing an exemplary configuration of an interactive advertisement system 400 that is a fourth embodiment according to the present invention. FIG. 16 is an imaginary view showing an exemplary format of a data in an advertisement specific channel.

This interactive advertisement system 400 is directed to a system, in which there is provided a hand held terminal device 401 with a tuner function as shown in FIG. 15, provided as an example of an information processing apparatus, and advertisement information D2 concerning an interactive advertisement is directly received from the broadcast station 9 or the like through a rod antenna 41 so as to be stored in a non-volatile memory. Of course, broadcast information contents D1 concerning a data broadcasting program may be downloaded.

In particular, there is shown a case in which advertisement information D2 is distributed exclusively by using an advertisement specific channel. The advertisement specific channel used here denotes a channel for specially distributing only the advertisement information D2 concerning an advertisement. After receipt of the advertisement information D2, in the hand held terminal device 401, the user can read out and freely operate advertisement information D2 concerning an interactive advertisement from a flash memory in unreal time any time and any place the user likes.

Of course, advertisement information D2 includes video image element and audio information D22 concerning an advertisement whose information can be operated by the user; and program information 21 for processing these items of information D22. In this example, in the advertisement specific channel, a plurality of advertisement information D2 are distributed. In any of the items of advertisement information D2 downloaded from the advertisement specific channel a priority to display it many times prior to another advertisement video image is set in advance.

In the advertisement specific channel, as shown in FIG. 16, all the data concerning a plurality of advertisements are broadcast one time, and the entire program is composed of a directory file and "n" commercials CM1 to CMn. Namely, the directory file is placed at the beginning of the program, and concerning an advertisement contained in this program, the number (n) of contents of commercials (CM); "n" items of CM directory information; CM counts, program size; on air codes that is a broadcast date and time; program codes and the like are described in a data packet.

Following this directory file, the commercial data CMi (i=1 to n) of each company is arranged sequentially. A file header is assigned to each of the commercial data CMi. At the header, there are described advertisement information D2 such as advertisement codes such as advertisement number; client codes for discriminating each advertiser 99; file size indicating data length; a variety of flags for formatting and controlling data or the like. The CM data following these items of information contains program information D21+video image element and audio information D22, like game software. The contents of these items of information are as described with reference to FIG. 7.

Figure 17:
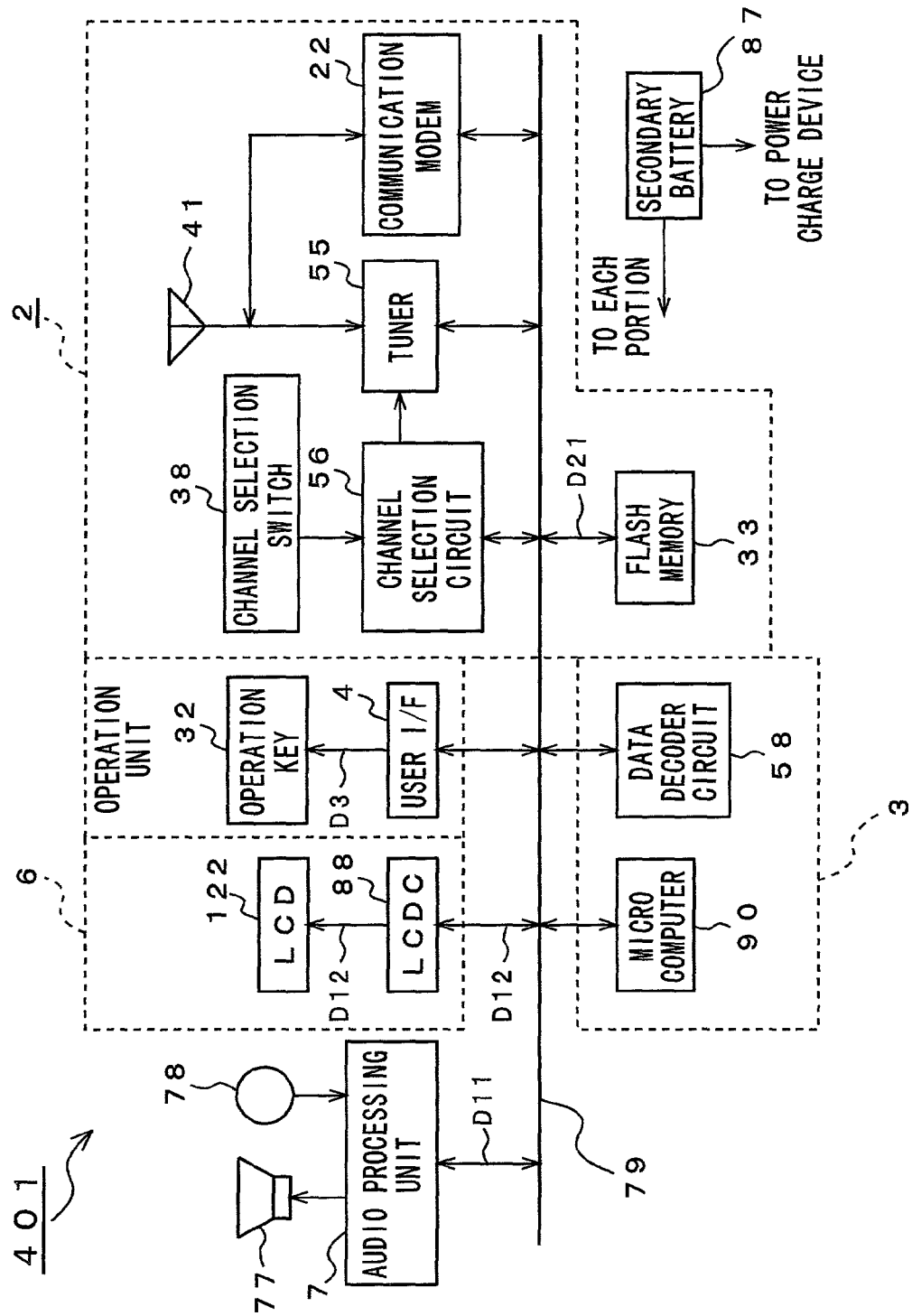
FIG. 17 is a block diagram depicting an exemplary internal configuration of a hand held terminal device 401.

Now, an exemplary internal configuration of a hand held terminal device 401 with a tuner device will be described here. FIG. 17 is a block diagram depicting an exemplary internal configuration of the hand held terminal device 401. Like elements in the third embodiment are designated by line reference numerals and name, a description of which is omitted here because these functions are similar to that in third embodiment. In this example as well, in the case where a data is distributed by an existing broadcast infrastructure, the data multiplexed in a vertical blanking period of a data broadcast signal adopted by the broadcast infrastructure is received in the tuner 55, and the data is provided so as to be downloaded on the flash memory 33.

The hand held terminal device 40 shown in FIG. 17 receives a group of data sent from the broadcast station 9, and causes image processing, and has a system bus 79. To this system bus 79, there are connected a receiver 2, a control device 3, an operating unit including user interface 4 and operation key 32, a display unit 6, and an audio processing unit 7 or the like. These receiver 2, processing unit 3 and 7, operating unit and display unit 6 are driven by means of a secondary battery 87.

The receiver 2 has a tuner 55, a communication modem 22, a channel selection switch 38, a channel selection circuit 56 and a flash memory 33. This receiver receives a group of data by means of the tuner 55 or communication modem 22. Then, data such as broadcast information contents D1 after decoded, program information D21, or video image element and audio information D22 is stored in the flash memory 33.

This communication modem 22 is connected to Internet, telephone line, or satellite line and the like so that a group of data received by these communication lines are temporarily stored in the flash memory. The communication modem 22 is used as a telephone function for transmitting and receiving an audio between a local station and a remote station. In the case where a simple hand held terminal device such as hand held radio, having only a tuner function, is configured, the communication modem 22 may be omitted. In contrast, in the case where a hand held terminal device having a telephone function is configured, it is mandatory that the communication modem 22 is provided.

The control device 3 in this example has a data decoding circuit 58 and a microcomputer 90 in which the video image element and audio information D22 is arbitrarily video imaged and processed based on the program information D21 stored in the flash memory 33 and operation input D3 passed through the user interface 4 so as to reproduce the advertisement video image and its audio. Of course, a data broadcasting program may be reproduced based on the broadcast information contents D1.

The user interface 4 configuring the operating unit is connected to this system bus 79, and an operation key 32 is connected to this interface 86. The operation key 32 is operated to control the data decoding circuit 58 and the microcomputer 90.

Further, a liquid crystal display controller (LCDC) 88 configuring a display unit 6 is connected to the system bus 79, and a liquid crystal display monitor 122 is connected to this controller 88 so as to display an interactive advertisement video image operated by the operation key 32. The audio processing unit 7 reproduces audio information according to an interactive advertisement, and performs amplification. Then, an audio signal is output to the speaker 77. In the case of the audio processing unit with a hand held telephone function, it functions as a telephone receiver. A microphone 78 is connected to this audio processing unit 7. In the case of the audio processing unit with the hand held telephone function, it functions as a transmitter.

Figure 18:
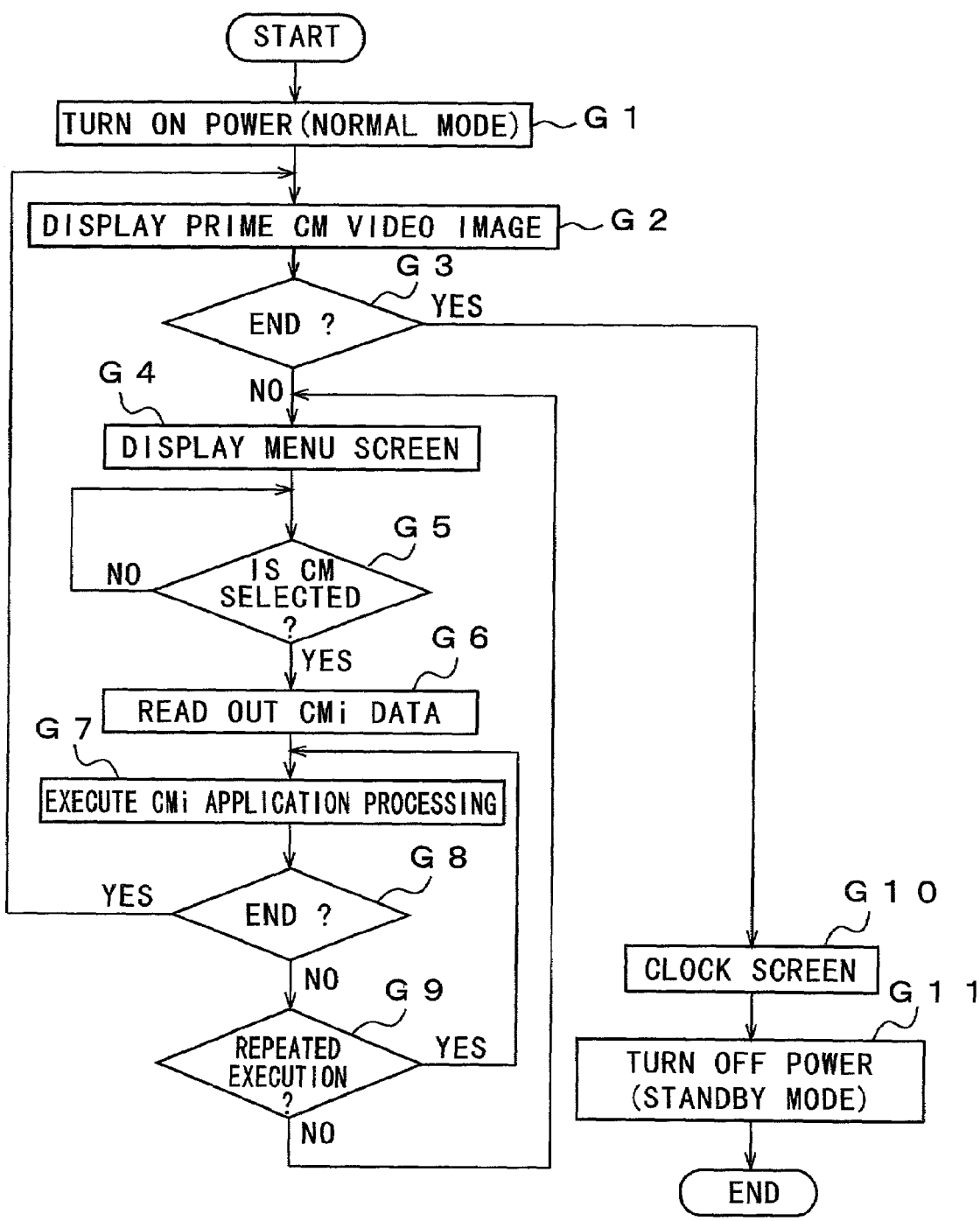
FIG. 18 is a flow chart showing an exemplary operation of the hand held terminal device 401.

Now, an exemplary operation of a hand held terminal device 401 with its tuner function will be described here. FIG. 18 is a flow chart showing an example of data processing when the user sees and hears an advertisement specific channel of the hand held terminal device 401.

The present embodiment assumes a case in which an advertisement specific channel is selected by using an existing terrestrial broadcasting infrastructure, and data concerning an interactive advertisement are distributed from the broadcast station 9 to the hand held terminal device 401. There is exemplified a case in which at the transmission side, as electronic information contents D0 concerning an advertisement, there is provided, for example, advertisement information D2 consisting of n commercial data CMi (i=1 to n) concerning vehicle sale, real estate sale, cosmetic sale, game software sale, or the like, and these data D2=CM1+CM2+CM3 . . . CMn are transmitted by using a vertical blanking period of a TV broadcast signal. A priority is set to commercial data CMi. The information concerning this priority can be described in the directory file or file header shown in FIG. 16, for example.

For example, the priority of commercial contents can be changed day by day. This change is made in order to improve an advertisement effect. This example assumes a case in which a priority is highly set to commercial data CM8 of the broadcast date. The advertisement caused by commercial data CM8 to which a high priority is set is referred to as prime CM hereinafter. This prime CM video image is defined as commercial contents with their guaranteed exposure frequency, and of course, an advertisement fee is high. This prime CM video image is always organized to appear on a screen when power is turned ON and OFF in many CM program groups CMi (i=1 to n) configured by being downloaded once.

In this case, the liquid crystal display monitor 122 is provided so as to first display a prime CM video image caused by commercial data CM8 before displaying an advertisement video image (hereinafter, referred to as a second CM) caused by commercial data CM1 to CM7 and CM9 to CMn to which no priority is set. In addition, the prime CM video image is displayed again after the display of the second CM video image has been ended.

When a prime CM is further displayed, a control program is executed such that the user can select arbitrary commercial data CMi from among the remaining commercial data CM1 to CM7 and CM9 to CMn. Namely, another CM group is executed by being selected on a menu screen so that the user Hj starts up and operates a CM program like playing a mini game.

This example assumes a case in which a flash memory 43 stores in advance advertisement information D2=CM1+CM2+CM3 . . . CMn that consists of "n" commercial data CMi (i=1 to n) concerning vehicle sale, real estate sale, cosmetics sale, or game software sale or the like; and the hand held terminal device 401 enters a standby mode.

With this being presumed, when power is turned ON at the step G1 in the flow chart shown in FIG. 18, a standby mode is released, and the hand held terminal device 401 goes to a normal mode. Then, processing goes to the step G2 at which a prime CM video image is displayed on the liquid crystal display monitor 122. At this time, the program information D21 according to the prime CM and the video image element and audio information D22 are read out from the flash memory 33 to the microcomputer 90. Then, the display unit 6 or audio processing unit 7 and the like is controlled by means of the microcomputer 90, whereby a three-dimensional, high resolution prime CM video image and its audio are reproduced.

At this time as well, as described in the second embodiment, the operation key 32 is operated with respect to the prime CM, whereby the video image element and audio information D22 can be video imaged and processed based on the program information D21 as described in FIG. 13, and a two-dimensional or three-dimensional video image of an interactive advertisement can be played like playing a game.

Then, processing goes to the step G3 at which it is judged whether or not the interactive advertisement operating mode is ended. This judgment is entrusted to the user Hj. In the case where the interactive advertisement operating mode is not ended at the step G3, processing goes to the step G4 at which a menu screen is displayed. The menu selection screen displays commercial data CMi (i=1 to 7, 9 to n) according to "n−1" second CMs such as vehicle sale, real estate sale, cosmetics sale or the like other than commercial data CM8 according to the prime CM. Of course, at this time, the commercial data CM8 according to the prime CM may also be displayed.

Then, processing goes to the step G5 at which the microcomputer 90 waits until the commercial data CMi according to the second CM has been selected. Here, the user Hj selects an arbitrary second CM from among "n" second CMs. In the microcomputer 90, the commercial data CMi selected by the user Hj is read out from the flash memory 33.

Then, processing goes to the step G7 at which application processing of commercial data CMi is executed in the microcomputer 90. At this time as well, the program information D21 according to the second CM and the video image element and audio information D22 are read out from the flash memory 33 to the microcomputer 90. Then, the display unit 6 or audio processing unit 7 and the like is controlled by means of the microcomputer 90, whereby a three-dimensional and high resolution second CM video image and its audio is reproduced.

At this time, as described in the second embodiment, the operation key 32 is operated with respect to the second CM, whereby the video image element and audio information D22 can be video imaged and processed based on the program information D21 as described in FIG. 13, and a two-dimensional or three-dimensional video image of an interactive advertisement can be played like playing a game.

Then, processing goes to the step G8 at which it is judged whether or not the application processing is ended. This judgment is also made by the user Hj. In the case where the application processing is ended, processing reverts to the step G2 at which a prime CM video image is displayed. In the case where the application processing is not ended, processing goes to the step G9 at which it is judged whether or not the application processing is repeatedly executed.

This judgment is also made by the user Hj. In the case where the application processing is repeatedly executed, processing reverts to the step G7 at which application processing of commercial data CMi is repeatedly executed. In the case where the application processing is not repeatedly executed at the step G9, processing reverts to the step G4 at which a menu screen is displayed again. On this menu screen, there are provided a variety of selection modes in which advertisement objects are classified by categories such as software, commodity, company or randomly (in a shuffling manner) or by user's characteristic dependency and the like.

Application processing selected on the menu screen is executed. When the application processing is then ended at the step G8, processing reverts to the step G2 at which a prime CM video image is displayed again. In the case where the interactive advertisement operating mode is ended, processing goes to the step G10 in accordance with a command issued by the user Hj to end the microcomputer 90 at the step G3. Then, the liquid crystal display monitor 122 is set to a clock screen, the microcomputer 90 detects power OFF information, and enters a standby mode.

In this way, in an interactive advertisement system 400 that is a fourth embodiment according to the present invention, the video image element and audio information D22 concerning a plurality of advertisements whose information can be operated by the user Hj and the program information D21 for processing these items of information D22 are provided to be distributed by using an advertisement specific channel.

Therefore, an advertisement video image can be operated at the user side like playing a game. Thus, in the future, electronic information contents D0 concerning an advertisement can be expected to naturally spread in an increased number of users Hj who likes to play a game. This makes it possible to contribute to the introduction into a new demand for advertisement industry.

Moreover, as in the second embodiment, unlike an advertisement of a conventional television or radio broadcast, the advertisement information D2 temporarily stored in the flash memory 33 of the hand held terminal device 401 is used, and the user can see or hear and operate an interactive advertisement itself any time he or she likes.

In the fourth embodiment, the microcomputers 70 and 90 or interfaces 60 and 70 can be integrated with each other in comparison with a case in which the hand held terminal device 14 and the tuner device 24 are created separately as in the second embodiment. Thus, in comparison with a case in which the hand held terminal device 14 and the tuner device 24 are provided separately, thereby constructing an interactive advertisement system, the hand held terminal device 401 with its tuner function is provided, thereby making it possible to reduce the cost of an information processing apparatus applied in the interactive advertisement system 400 and to simplify the system.

As has been described above, an electronic information content distribution processing system according to the present invention comprises an information processing apparatus for information processing electronic information contents containing an advertisement, wherein electronic information contents are received and stored; the electronic information contents are read out according to a user operation; the electronic information contents are processed; and then, an advertisement video image and audio information is output.

With this configuration, a concept of an advertisement caused, the advertisement having been supplied one-sidedly, is reversed, and an electronic advertisement medium for interactively performing an advertisement can be constructed. Moreover, the user can operates an advertisement information medium freely while feeling more enjoyable relevant to an advertisement that has been just seen and heard. Thus, the user's interest is improved, and an advertiser can implement an advertisement with its long advertisement life and high advertisement effect.

An information distribution apparatus according to the present invention comprises a transmitter for, in the case where electronic information contents containing an advertisement are provided to the user, transmitting to the user's information processing apparatus a carrying signal in which a group of data relevant to electronic information contents concerning an advertisement is constructed and inserted.

With this configuration, in the user's information processing apparatus, a group of data can be received in batch in a predetermined period of time, and can be stored in a storage device or the like all together. Therefore, after receipt of electronic information contents, the user can see and hear an advertisement video image or audio information freely processed with respect to an advertisement by the information processing apparatus in unreal time (asynchronously).

In an information processing apparatus according to the present invention, in the case where electronic information contents containing an advertisement are information processed, the electronic information contents are received and stored, the electronic information contents are read out according to the user operation, the electronic information contents are processed, and then, an audio advertisement video image and audio information is output.

With this configuration, after receipt of electronic information contents, the user can see and hear freely the advertisement video image and audio information obtained after arbitrarily information processed like playing a game in unreal time. In this manner, a new game medium following arcade game, home use game machine, or hand held game machine can be created. A new medium fusing the entertainment device and advertisement can be created.

In an electronic information content distribution processing method according to the present invention, in the case where electronic information contents containing an advertisement are provided to the user, and the electronic information contents are information processed at the user side, the electronic information contents are distributed to the user, and the thus distributed electronic information contents are received and stored. Then, electronic information contents are read out according to the user operation so as to reproduce an advertisement video image and audio information based on the electronic information contents.

With this configuration, the user can operate electronic information contents like playing a game. In the future, the electronic information contents concerning an advertisement can be expected to naturally spread in an increased number of users who likes to play a game. Therefore, an advertisement effect can be improved, making it possible to introduce a demand for a new advertisement industry. Instead of a commodity guidance that has been supplied one-sidedly, the commodity is expressed with a variety of angles and colors, whereby the user can have an image as if the commodity were touched in hands. As a result, more detailed commodity recognition can be imparted to the user, making it possible to bring a chance in which the user can be familiar with commodities on a video image space.

In addition, a conventional advertisement production has been dominant in cumbersome and costly work such that talents or new products are defined as main items, thereby causing performance or photographing activities. According to the method of the present invention, work concerning advertisement production can be digitally processed. In addition, a demand for digital creators engaged in animation, game software, or cinema production is increased, making it possible to cause creation of new employment and introduction into new industry. Further, exchange between a company that is an advertiser and a CM production creator is made actively, and the development and spread of computer graphic technology can be accelerated.

The present invention is applied very preferably to a new advertisement medium such that the user operates advertisement contents distributed via broadcast or communication interactively and feels more enjoyable like playing a game.

What is claimed is:

1. An interactive advertising system comprising:
   an electronic distribution apparatus adapted to distribute electronic information content which includes interactive advertisements and broadcast information, wherein the data format of the electronic information comprises:
      a transfer request command at the beginning of the data,
      dummy packet following the transfer request command,
      a program start command, and
      program data packets;
   a tuner adapted to receive the interactive advertisements and broadcast information and store the interactive advertisements and broadcast information in a first storage device; and
   an electronic gaming console adapted to retrieve the interactive advertisements and broadcast information from the first storage device, store the interactive advertisements and broadcast information in a second storage device, and process either the interactive advertisements or broadcast information for display based on a user selection.

2. The interactive advertising system of claim 1, wherein there is provided an interactive advertisement specific channel for distributing only the electronic information contents concerning said interactive advertisements.

3. The interactive advertising system of claim 1, wherein said electronic information contents are provided so as to be distributed using existing broadcasting infrastructure or communication infrastructure.

4. The interactive advertising system of claim 3, wherein in the case of using said existing broadcasting infrastructure or communication infrastructure, at least broadcasting information content and interactive advertisement content are constructed in a group of data, and the data are transmitted to be multiplexed in a vertical blanking period of a television broadcast signal adopted at said existing broadcasting infrastructure or communication infrastructure.

5. The interactive advertising system of claim 1, wherein said electronic gaming console displays at least one interactive advertisement prior to displaying said broadcasting information contents.

6. The interactive advertising system of claim 5, wherein when the display of broadcasting information contents is terminated, said electronic gaming console displays at least one interactive advertisement.

7. The interactive advertising system of claim 5, wherein when an interactive advertisement is displayed, said electronic gaming console executes a control program so as to select whether to set a mode for displaying said broadcasting information content or a mode for continuously displaying said interactive advertisement content.

8. The interactive advertising system of claim 1, wherein the interactive advertisements are displayed either as a two-dimensional or three-dimensional image.

9. The interactive advertising system of claim 8, wherein the electronic gaming console comprises:
   a controller adapted to allow a user to manipulate interactive features of the selected interactive advertisement.

10. The interactive advertising system of claim 9, wherein the interactive features may include zooming, rotating, manipulating colors, changing viewing perspectives, and accessing other images.

11. An interactive advertising system comprising:
    an electronic distribution apparatus adapted to distribute electronic information content which includes interactive advertisements and broadcast information, wherein the data format of the electronic information comprises:
       a transfer request command at the beginning of the data,
       dummy packet following the transfer request command,
       a program start command, and
       program data packets;
    a tuner adapted to receive the interactive advertisements and broadcast information and store the interactive advertisements and broadcast information in a first storage device; and
    a hand held terminal device connectable to said tuner device, wherein said hand held terminal device comprises:
       a computing unit adapted to retrieve the interactive advertisements and broadcast information from the first storage device, store the interactive advertisements and broadcast information in a second storage device, and process either the interactive advertisements or broadcast information for display based on a user selection;
       a control unit adapted to enter said user selection; and
       a display unit adapted to display the processed interactive advertisements and the broadcast information.

12. The interactive advertising system of claim 11, wherein a communication modem is provided at said hand held terminal device so as to receive said electronic information contents distributed by using an existing communication infrastructure.

13. The interactive advertising system of claim 11, wherein there is provided an interactive advertisement specific channel for distributing only the electronic information contents concerning said interactive advertisements.

14. The interactive advertising system of claim 11, wherein said electronic information contents are provided so as to be distributed using existing broadcasting infrastructure or communication infrastructure.

15. The interactive advertising system of claim 14, wherein in the case of using said existing broadcasting infrastructure or communication infrastructure, at least broadcasting information content and interactive advertisement content are constructed in a group of data, and the data are transmitted to be multiplexed in a vertical blanking period of a television broadcast signal adopted at said existing broadcasting infrastructure or communication infrastructure.

16. The interactive advertising system of claim 11, wherein said hand held terminal device displays at least one interactive advertisement prior to displaying said broadcasting information contents.

17. The interactive advertising system of claim 16, wherein when the display of broadcasting information content is terminated, said hand held terminal device displays at least one interactive advertisement.

18. The interactive advertising system of claim 16, wherein when an interactive advertisement is displayed, said hand held terminal device executes a control program so as to select whether to set a mode for displaying said broadcasting information content or a mode for continuously displaying said interactive advertisement content.

19. The interactive advertising system of claim 11, wherein the interactive advertisements are displayed either as a two-dimensional or three-dimensional image.

20. The interactive advertising system of claim 19, wherein the hand held terminal device comprises:
 a controller adapted to allow a user to manipulate interactive features of the selected interactive advertisement.

21. The interactive advertising system of claim 20, wherein the interactive features may include zooming, rotating, manipulating colors, changing viewing perspectives, and accessing other images.

22. A method of displaying electronic information content which includes interactive advertisements and broadcast information, comprising:
 transferring the electronic information content to an information processing apparatus by a terrestrial wave, wherein the data format of the electronic content comprises:
  a transfer request command at the beginning of the data,
  dummy packet following the transfer request command,
  a program start command, and
  program data packets;
 initially displaying a spot advertisement and not broadcast information in response to a user selecting to view broadcast information;
 executing a control program such that the user may select whether to proceed to view broadcast information or view interactive advertisements;
 displaying, in response to a selection to view interactive advertisements, an interactive advertisement comprising a two-dimensional or a three-dimensional video image with at least a hierarchy of the display contents of the spot advertisement that may be navigated by the user; and
 displaying, in response to a selection to view the broadcast information, broadcast information.

23. The method of claim 22, wherein the information processing apparatus is a video game console.

24. The method of claim 22, wherein the information processing apparatus is a personal computer.

25. The method of claim 22 wherein the information processing apparatus is a hand held terminal device.

26. The method of claim 22, wherein the program data packets are organized into blocks and wherein each block comprises:
 a block header;
 a program start command at the beginning of the program data packets; and
 the data packets themselves.

27. The method of claim 26, wherein data of the program data packets comprises:
 program information, wherein the program information comprises:
  an application main body;
  a module group; and
  a library group;
 and a video image element information and audio information, wherein the video image element information and audio information comprises:
  a graphic model data group;
  a graphic texture data group;
  a sound sequence data group; and
  a sound wave group.

28. An electronic gaming console comprising a user selectable device allowing a user to select between operations modes comprising:
 a game mode for executing a game based on data from an optical disk device;
 a program reproduction mode for displaying broadcast information data stored within an internal memory, wherein the broadcast information data is transmitted to the electronic gaming console using a data format comprising:
  a transfer request command at the beginning of the data
  dummy packet following the transfer request command,
  a program start command, and
  program data packets; and
 an interactive advertisement operating mode for displaying interactive advertisements stored within an internal memory.

29. A hand-held information processing apparatus comprising a user selectable device allowing a user to select between operations modes comprising:
 a game mode for executing a game based on data from a memory device;
 a program reproduction mode for displaying broadcast information data stored within an internal memory, wherein the broadcast information data is transmitted to the electronic gaming console using a data format comprising:
  a transfer request command at the beginning of the data,
  dummy packet following the transfer request command,
  a program start command, and
  program data packets; and
 an interactive advertisement operating mode for displaying interactive advertisements stored within an internal memory.

* * * * *